(12) United States Patent
Okumoto et al.

(10) Patent No.: US 8,196,558 B2
(45) Date of Patent: Jun. 12, 2012

(54) SYSTEM FOR RESTARTING INTERNAL COMBUSTION ENGINE WHEN ENGINE RESTART REQUEST OCCURS

(75) Inventors: Kazushige Okumoto, Kariya (JP); Akira Kato, Anjo (JP); Takashi Senda, Niwa-gun (JP); Mitsuhiro Murata, Niwa-gun (JP); Masami Niimi, Handa (JP); Kiyokazu Haruno, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/275,089

(22) Filed: Oct. 17, 2011

(65) Prior Publication Data

US 2012/0035837 A1 Feb. 9, 2012

Related U.S. Application Data

(62) Division of application No. 12/585,037, filed on Sep. 1, 2009, now Pat. No. 8,069,832.

(30) Foreign Application Priority Data

| Sep. 2, 2008 | (JP) | 2008-224277 |
| Mar. 8, 2009 | (JP) | 2009-054318 |
| May 19, 2009 | (JP) | 2009-121437 |

(51) Int. Cl.
*F02N 11/00* (2006.01)
(52) U.S. Cl. ............... 123/179.4; 123/179.25
(58) Field of Classification Search ............... 123/179.3, 123/179.4, 179.28, 179.25, 185.5, 185.9, 123/185.11; 701/110, 112, 113
See application file for complete search history.

(56) References Cited

U.S. PATENT DOCUMENTS

| 6,308,674 | B1 | 10/2001 | Ruehle et al. |
| 6,651,603 | B2 | 11/2003 | Osada et al. |
| 7,275,509 | B2 | 10/2007 | Kassner |
| 7,681,545 | B2 | 3/2010 | Taki et al. |
| 8,036,815 | B2 * | 10/2011 | Okumoto et al. ............. 701/110 |
| 2002/0017260 | A1 | 2/2002 | Saito et al. |

(Continued)

FOREIGN PATENT DOCUMENTS

DE 10 2005 004 326 A1 2/2006

(Continued)

OTHER PUBLICATIONS

Office Action dated Jan. 31, 2011 issued in co-pending U.S. Appl. No. 12/585,037.

(Continued)

*Primary Examiner* — Hai Huynh
(74) *Attorney, Agent, or Firm* — Oliff & Berridge, PLC

(57) ABSTRACT

In a system, a starter includes a motor for rotatably driving an output shaft with a pinion and an actuator that shifts the pinion toward a ring gear to be engaged with the ring gear. A monitor unit monitors a rotational speed of the internal combustion engine. The rotational speed of the internal combustion engine drops after an automatic control for stop of the engine. When an engine restart request occurs with the rotational speed being within a preset range during the rotational speed of the internal combustion engine dropping by the automatic control for stop of the engine, a drive unit drives the actuator to shift the pinion toward the ring gear to be engaged with the ring gear. The drive unit rotatably drives the motor with the pinion being engaged with the ring gear to thereby crank the crankshaft.

2 Claims, 14 Drawing Sheets

U.S. PATENT DOCUMENTS

| | | | |
|---|---|---|---|
| 2004/0221828 A1 | 11/2004 | Ries-Mueller et al. | |
| 2008/0127927 A1 | 6/2008 | Hirning et al. | |
| 2008/0162007 A1 | 7/2008 | Ishii et al. | |
| 2009/0020091 A1 | 1/2009 | Botzenhard et al. | |
| 2009/0224557 A1 | 9/2009 | Reynolds et al. | |
| 2010/0059007 A1 | 3/2010 | Senda et al. | |
| 2010/0256896 A1* | 10/2010 | Kitano et al. | 701/113 |
| 2010/0326389 A1 | 12/2010 | Okumoto et al. | |
| 2011/0132308 A1 | 6/2011 | Liu et al. | |
| 2011/0202254 A1* | 8/2011 | Ishikawa et al. | 701/103 |

FOREIGN PATENT DOCUMENTS

| | | |
|---|---|---|
| DE | 10 2005 049 092 A1 | 4/2007 |
| DE | 10 2006 011 644 A1 | 9/2007 |
| DE | 10 2006 039 112 A1 | 2/2008 |
| DE | 10 2007 033 677 A1 | 1/2009 |
| EP | 1 939 444 A2 | 7/2008 |
| EP | 2 243 952 A2 | 10/2010 |
| JP | Y2-56-42437 | 10/1981 |
| JP | A-2000-314364 | 11/2000 |
| JP | A-2001-317439 | 11/2001 |
| JP | A-2001-525037 | 12/2001 |
| JP | A-2002-70699 | 3/2002 |
| JP | A-2002-122059 | 4/2002 |
| JP | A-2003-65191 | 3/2003 |
| JP | A-2004-003434 | 1/2004 |
| JP | B2-3551783 | 5/2004 |
| JP | A-2005-113781 | 4/2005 |
| JP | A-2005-146875 | 6/2005 |
| JP | A-2005-330813 | 12/2005 |
| JP | A-2007-107527 | 4/2007 |
| JP | B2-4029891 | 10/2007 |
| JP | B2-4083268 | 2/2008 |
| JP | A-2008-510099 | 4/2008 |
| JP | B2-4108140 | 4/2008 |
| JP | A-2008-163818 | 7/2008 |
| JP | B2-4211208 | 11/2008 |
| JP | A-2009-500550 | 1/2009 |
| WO | WO 2007/101770 A1 | 9/2007 |

OTHER PUBLICATIONS

Office Action issued in co-pending U.S. Appl. No. 12/873,364 on Feb. 28, 2011.

Apr. 28, 2011 European Search Report in European Application No. 09011211.1.

Apr. 28, 2011 European Search Report in European Application No. 10015688.4.

Apr. 28, 2011 European Search Report in European Application No. 10015687.6.

Partial European Search Report dated Nov. 4, 2010 for European Patent Application No. EP 09 01 1211.

\* cited by examiner

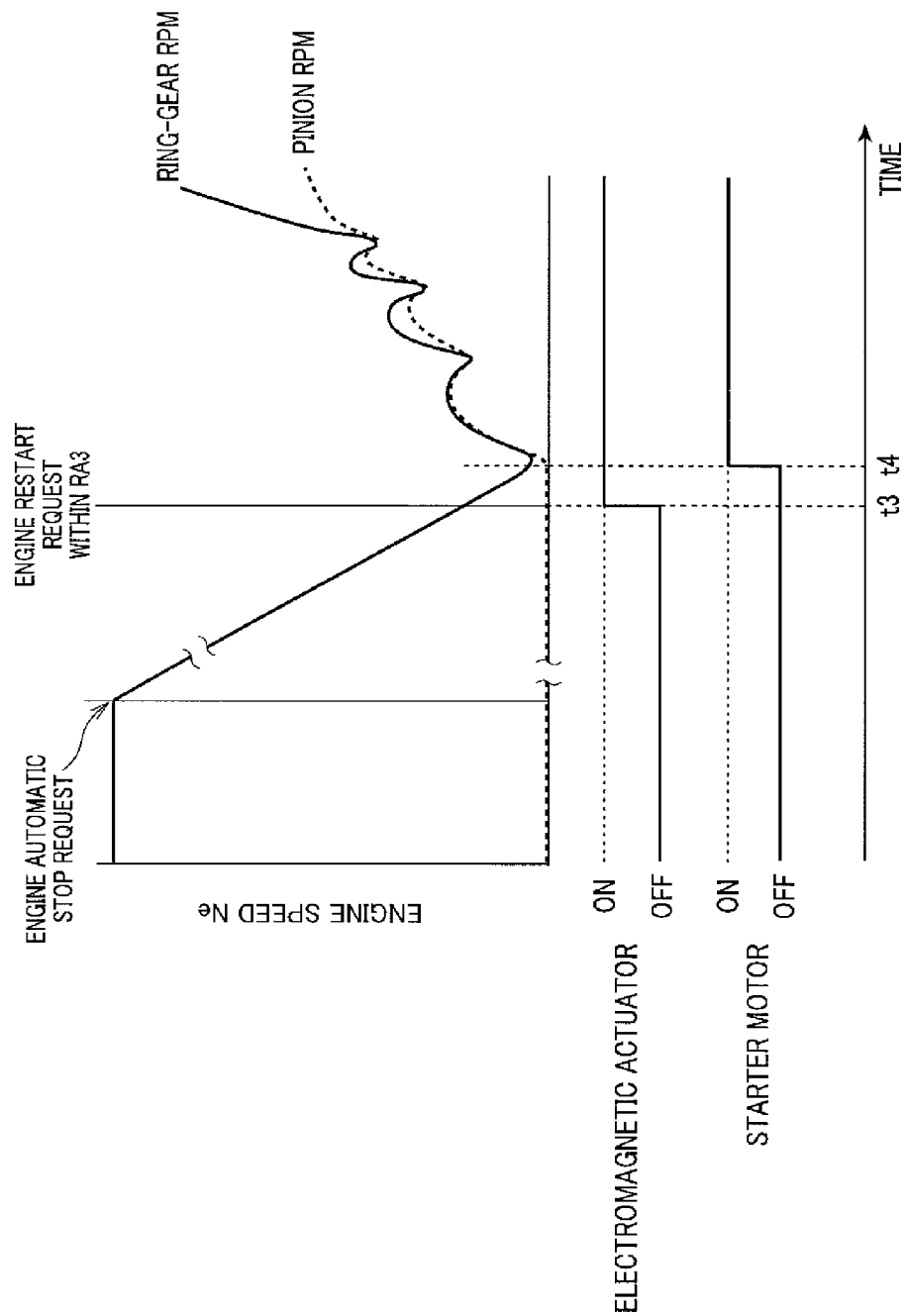

SYSTEM FOR RESTARTING INTERNAL COMBUSTION ENGINE WHEN ENGINE RESTART REQUEST OCCURS

CROSS REFERENCE TO RELATED APPLICATIONS

This application is a Divisional of application Ser. No. 12/585,037 filed on Sep. 1, 2009 based on Japanese Patent Applications 2008-224277, 2009-54318, and 2009-121437 filed on Sep. 2, 2008, Mar. 8, 2009, and May 19, 2009, respectively. This application claims the benefit of priority from the Japanese Patent Applications, so that the descriptions of which are all incorporated herein by reference.

FIELD OF THE INVENTION

The present invention relates to systems for restarting internal combustion engines when an engine restart request occurs.

BACKGROUND OF THE INVENTION

Some types of vehicles installed with an engine automatic stop-and-start system, such as an idle reduction control system, have been recently developed for reduction in fuel cost, in exhaust emission, and the like. Such engine automatic stop-and-start systems, an example of which is disclosed in Japanese Patent Application Publication No. 2002-122059, are designed to automatically stop an internal combustion engine installed in a vehicle in response to a driver's engine stop request. After the stop of the internal combustion engine, these engine automatic stop-and-start systems are designed to cause, in response to a driver's operation to restart the vehicle, a starter to crank the internal combustion engine, thus restarting the internal combustion engine.

In normal starters, a pinion is shifted by an actuator toward a ring gear coupled to a crankshaft of an internal combustion engine to be engaged with the ring gear. While being meshed with the ring gear, the pinion is rotatably driven by a motor so that the crankshaft is rotated. This cranks the internal combustion engine.

Such an engine stop-and-start system is designed to, during the internal combustion engine being decelerated in response to a driver's engine stop request, when an engine restart request occurs, wait until the engine speed becomes nearly zero, and thereafter cause the starter to crank the internal combustion engine. For this reason, a substantial amount of time has elapsed since the occurrence of the engine restart request before the restart of the internal combustion engine. The elapsed time may cause the driver to feel that the restart of the internal combustion engine is delayed.

In order to address this problem, each of Japanese Patent Application Publications No. 2005-330813 and 2002-70699 discloses an engine stop-and-start system. The disclosed engine stop-and-start system is designed to, during the internal combustion engine being decelerated in response to a driver's engine stop request, when an engine restart request occurs, synchronize a rotational speed of the pinion with that of the ring gear, and thereafter engage the pinion with the ring gear to thereby cause the starter to crank the internal combustion engine.

However, the engine stop-and-start system disclosed in the Patent Application Publications No. 2005-330813 and 2002-70699 is designed to carry out the synchronization of the rotational speed of the pinion with that of the ring gear and the engagement of the pinion with the ring gear independently of: a value of the rotational speed of the internal combustion engine at the moment when the engine restart request occurs; and the behavior of the engine speed (rotational speed of the ring gear) after the occurrence of the engine automatic stop request. This, depending on at least one of the value of the rotational speed of the ring gear at the occurrence of the engine restart request and the behavior of the engine speed after the occurrence of the engine automatic stop request, may increase noises due to the engagement of the pinion with the ring gear.

SUMMARY OF THE INVENTION

In view of the circumstances set force above, an object of an aspect of the present invention is to provide systems for restarting an internal combustion engine; these systems are designed to determine a proper timing of the engagement of a pinion of a starter with a ring gear of the internal combustion engine according to at least one of a value of a rotational speed of the ring gear at the occurrence of an engine restart request and the behavior of an engine speed after the occurrence of an engine automatic stop request, thus smoothly restarting the internal combustion engine.

According to one aspect of the present invention, there is provided a system for restarting, according to an occurrence of an engine restart request, an internal combustion engine that has been automatically controlled for stop thereof in response to an engine automatic stop request. The internal combustion engine normally works to burn fuel therein to rotate a crankshaft with a ring gear attached thereto. The system includes a starter provided with a motor for rotatably driving an output shaft with a pinion and an actuator working to shift the pinion toward the ring gear to be engaged with the ring gear. The system includes a monitor unit working to monitor a rotational speed of the internal combustion engine. The rotational speed of the internal combustion engine drops by the automatic control for stop of the internal combustion engine. The system includes a drive unit. When the engine restart request occurs with the rotational speed being within a preset range during the rotational speed of the internal combustion engine dropping by the automatic control for stop of the internal combustion engine, the drive unit works to: drive the actuator to shift the pinion toward the ring gear to be engaged with the ring gear; and rotatably drive the motor with the pinion being at least partly engaged with the ring gear to thereby crank the crankshaft of the internal combustion engine.

The system according to the one aspect of the present invention immediately engages the pinion with the ring gear in response to the engine restart request, making it possible to restart the internal combustion engine with high responsivity with respect to the engine restart request.

According to another aspect of the present invention, there is provided a system for restarting, according to an occurrence of an engine restart request, an internal combustion engine that has been automatically controlled for stop thereof in response to an engine automatic stop request. The internal combustion engine normally works to burn fuel therein to rotate a crankshaft with a ring gear attached thereto. The system includes a starter provided with a motor for rotatably driving an output shaft with a pinion and an actuator working to shift the pinion toward the ring gear to be engaged with the ring gear. The system includes a monitor unit working to monitor a rotational speed of the internal combustion engine. The rotational speed of the internal combustion engine (ring gear) drops by the automatic control for stop of the internal combustion engine. The system includes an executing unit working to:

select, based on the rotational speed of the internal combustion engine at a timing of the occurrence of the engine restart request, any one of a first restart task and a second restart task;

execute, when the first restart task is selected, the first restart task to thereby, rotatably drive the motor, determine whether the pinion is allowed to be rotated with the ring gear, and, after it is determined that the pinion is allowed to be rotated with the ring gear, drive the actuator to shift the pinion toward the ring gear to be engaged with the ring gear to thereby crank the crankshaft of the internal combustion engine; and execute, when the second restart task is selected, the second restart task to thereby: drive the actuator to shift the pinion toward the ring gear to be engaged with the ring gear, and rotatably drive the motor with the pinion being at least partly engaged with the ring gear to thereby crank the crankshaft of the internal combustion engine.

The system according to another aspect of the present invention selects any one of the first restart task and the second restart task based on the rotational speed of the ring gear at a timing of the occurrence of the engine restart request.

Specifically, when the rotational speed of the internal combustion engine at the timing of the occurrence of the engine restart request is relatively high, the system determines that it is necessary to bring the rotational speed of the pinion to that of the ring gear. Then, the executing unit of the system executes the first restart task. The first restart task rotatably drives the motor, and determines whether the pinion is allowed to be rotated with the ring gear. After it is determined that the pinion is allowed to be rotated with the ring gear, the system determines that the pinion can be smoothly meshed with the ring gear. Then, the executing unit drives the actuator to shift the pinion toward the ring gear to be engaged with the ring gear to thereby crank the crankshaft of the internal combustion engine.

Thus, it is possible to prevent or reduce noises due to the engagement of the pinion with the ring gear, and reduce the delay since the occurrence of the engine restart request to the restarting of the internal combustion engine.

In contrast, when the rotational speed of the internal combustion engine at the timing of the occurrence of the engine restart request is relatively low, the system determines that the pinion can be smoothly meshed with the ring gear without bringing the rotational speed of the pinion to that of the ring gear. Then, the executing unit of the system executes the second restart task. The second restart task drives the actuator to shift the pinion toward the ring gear to be engaged with the ring gear, and rotatably drive the motor with the pinion being at least partly engaged with the ring gear to thereby crank the crankshaft of the internal combustion engine.

Thus, the smooth engagement of the pinion with the ring gear can prevent or reduce noises due to the engagement of the pinion with the ring gear, and omit the operation required to bring the rotational speed of the pinion to that of the ring gear. This accelerates the start of the cranking of the internal combustion engine by the starter to thereby immediately restart the internal combustion engine, and reduces the amount of power consumption of the relay.

According to a further aspect of the present invention, there is provided a system for restarting, according to an occurrence of an engine restart request, an internal combustion engine that has been automatically controlled for stop thereof in response to an engine automatic stop request. The internal combustion engine normally works to burn fuel therein to rotate a crankshaft with a ring gear attached thereto. The system includes a starter provided with a motor for rotatably driving an output shaft with a pinion and an actuator working to shift the pinion toward the ring gear to be engaged with the ring gear. The system includes a monitor unit working to monitor a rotational speed of the internal combustion engine. The rotational speed of the internal combustion engine drops by the automatic control for stop of the internal combustion engine. The system includes a drive unit. When the rotational speed of the internal combustion engine reaches a preset speed close to or higher than zero without the engine restart request occurring, the drive unit works to drive the actuator to shift the pinion toward the ring gear to be engaged with the ring gear. When the engine restart request occurs after the engagement of the pinion with the ring gear, the drive unit rotatably drives the motor to thereby crank the crankshaft of the internal combustion engine.

This immediately cranks the ring gear in response to the occurrence of the engine restart request while preventing the pinion from being meshed with the ring gear during the positive and negative oscillations of the rotational speed of the internal combustion engine. This makes it possible to prevent noises from occurring.

According to a still further aspect of the present invention, there is provided a system for restarting, according to an occurrence of an engine restart request, an internal combustion engine that has been automatically controlled for stop thereof in response to an engine automatic stop request. The internal combustion engine normally works to burn fuel therein to rotate a crankshaft with a ring gear attached thereto. The system includes a starter provided with a motor for rotatably driving an output shaft with a pinion and an actuator working to shift the pinion toward the ring gear to be engaged with the ring gear. The system includes a monitor unit working to monitor a parameter associated with a difference between a rotational speed of the internal combustion engine and a rotational speed of the pinion. The rotational speed of the internal combustion engine drops by the automatic control for stop of the internal combustion engine. A behavior of the rotational speed of the internal combustion engine positively and negatively oscillates after the rotational speed of the internal combustion engine has first reached zero. The system includes a drive unit. When the engine restart request occurs at least one of: during the rotational speed of the internal combustion engine dropping, and during the behavior of the rotational speed of the internal combustion engine positively and negatively oscillating, after the monitored parameter has been within a preset range, the drive unit works to drive the actuator to shift the pinion toward the ring gear to be engaged with the ring gear, and rotatably drive the motor with the pinion being at least partly engaged with the ring gear to thereby crank the crankshaft of the internal combustion engine.

This immediately cranks the ring gear in response to the occurrence of the engine restart request while preventing the pinion from being meshed with the ring gear during the positive and negative oscillations of the rotational speed of the internal combustion engine. This makes it possible to prevent noises from occurring.

According to a still further aspect of the present invention, there is provided a system for restarting, according to an occurrence of an engine restart request, an internal combustion engine that has been automatically controlled for stop thereof in response to an engine automatic stop request. The internal combustion engine normally works to burn fuel therein to rotate a crankshaft with a ring gear attached thereto.

The system includes a starter provided with a motor for rotatably driving an output shaft with a pinion and an actuator working to shift the pinion toward the ring gear to be engaged with the ring gear. The system includes a monitor unit working to monitor a parameter associated with a difference between a rotational speed of the internal combustion engine and a rotational speed of the pinion. The rotational speed of the internal combustion engine drops by the automatic control for stop of the internal combustion engine. A behavior of the rotational speed of the internal combustion engine positively and negatively oscillates after the rotational speed of the internal combustion engine has first reached zero. The system includes a drive unit. When the engine restart request occurs at least one of: during the rotational speed of the internal combustion engine dropping, and during the behavior of the rotational speed of the internal combustion engine positively and negatively oscillating, the drive unit works to rotatably drive the motor to thereby rotate the pinion so that the monitored parameter has been within a preset range, and drive the actuator to shift the pinion toward the ring gear to be engaged with the ring gear to thereby crank the crankshaft of the internal combustion engine.

This smoothly engages the pinion with the ring gear, making it possible to prevent noises from occurring due to the engagement.

BRIEF DESCRIPTION OF THE DRAWINGS

Other objects and aspects of the invention will become apparent from the following description of embodiments with reference to the accompanying drawings in which:

FIG. 5 is a timing chart schematically illustrating driving timings of the electromagnetic actuator and the starter motor when the ECU operates in the third engine restart control mode according to the first embodiment;

DETAILED DESCRIPTION OF EMBODIMENTS OF THE INVENTION

Figure 1:
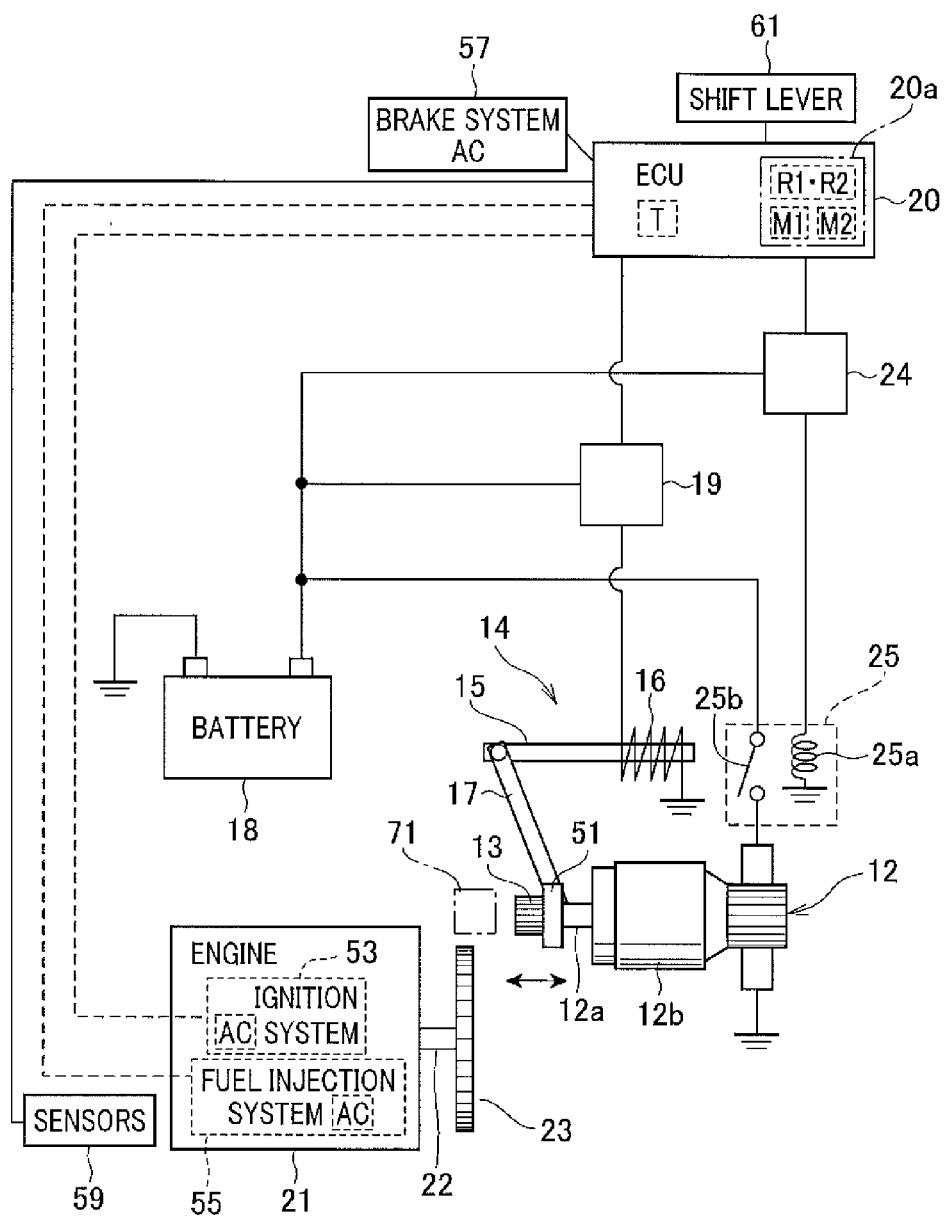
FIG. 1 is a view schematically illustrating an example of the overall hardware structure of an engine starting system according to the first embodiment of the present invention.

Embodiments of the present invention will be described hereinafter with reference to the accompanying drawings. In the drawings, identical reference characters are utilized to identify identical corresponding components.

First Embodiment

An engine starting system 1 for an internal combustion engine 21 installed in a vehicle according to the first embodiment of the present invention will be described hereinafter with reference to FIGS. 1 to 6. The internal combustion engine, referred to simply as "engine", 21 has a crankshaft 22 with one end on which a ring gear 23 is mounted.

The engine 21 works to burn fuel within each cylinder thereof to thereby change the fuel energy to mechanical energy, such as rotative energy to thereby rotate the crankshaft 22. The rotation of the crankshaft 22 is transferred to driving wheels through a powertrain installed in the vehicle to thereby drive the vehicle.

In the vehicle, for controlling the engine 21, an ignition system 53 and a fuel injection system 55 are installed.

The ignition system 53 includes actuators, such as igniters, AC and causes the actuators AC to provide an electric current or spark to ignite an air-fuel mixture in each cylinder of the engine 21, thus burning the air-fuel mixture.

The fuel injection system 55 includes actuators, such as fuel injectors, AC and causes the actuators AC to spray fuel either directly into each cylinder of the engine 21 or into an intake manifold (or intake port) just ahead of each cylinder thereof to thereby burn the air-fuel mixture in each cylinder of the engine 21.

In addition, in the vehicle, for slowing down or stopping the vehicle, a brake system 57 is installed.

The brake system 57 includes, for example, disc or drum brakes as actuators AC at each wheel of the vehicle. The brake system 57 is operative to send, to each of the brakes, a deceleration signal indicative of a braking force to be applied from each brake to a corresponding one of the wheels in response to a brake pedal of the vehicle being depressed by the driver. This causes each brake to slow down or stop the rotation of a corresponding one of the wheels of the vehicle based on the sent deceleration signal.

Reference numeral 61 represents a hand-operable shift lever (select lever). When the vehicle is a manual transmission vehicle, the driver can change a position of the shift lever 61 to shift (change) a transmission gear ratio of the powertrain to thereby control the number of revolutions of the driving wheels and the torque generated by the engine 21 to the driving wheels. When the vehicle is an automatic transmission vehicle, the driver can change a position of the shift lever 61 to shift one of the drive ranges corresponding to a transmission gear ratio of the powertrain, such as Reverse range, Neutral range, Drive range, and the like.

In addition, in the vehicle, for measuring the operating conditions of the engine 21 and the driving conditions of the vehicle, sensors 59 are installed in the vehicle.

Each of the sensors 59 is operative to measure an instant value of a corresponding one parameter associated with the operating conditions of the engine 21 and/or the vehicle and to output, to the ECU 20, data indicative of the measured value of a corresponding one parameter.

Specifically, the sensors 59 include, for example, an accelerator sensor (throttle position sensor) and a brake sensor electrically connected to the ECU 20.

The accelerator sensor is operative to:

measure an actual position or stroke of a driver-operable accelerator pedal of the vehicle linked to a throttle valve for controlling the amount of air entering the intake manifold; and output, as data representing a driver's starting request, acceleration request, or deceleration request, for the engine 21, the measured actual stroke or position of the accelerator pedal.

The brake sensor is operative to measure an actual position or stroke of the brake pedal of the vehicle operable by the driver and to output, as data representing a driver's deceleration request, the measured actual stroke or position of the brake pedal.

The engine starting system 1 includes a starter 11, a battery 18, a relay 19, an ECU (Electronic Control System) 20, a switching element 24, and a relay 25.

The starter 11 is provided with a starter motor 12, a pinion 13, a one-way clutch 51, and an electromagnetic actuator 14. The one-way clutch 51 can be omitted.

The starter motor 12 has an output shaft 12a and an armature 12b coupled thereto and operative to rotate the output shaft 12a when the armature 12b is energized.

The one-way clutch 51 is provided in helical spline engagement with an outer circumference of one end of the output shaft 12a.

The pinion 13 is mounted on the one-way clutch 51 around the outer circumferential of the output shaft 12a to be shiftable together with the one-way clutch 51 in an axial direction of the output shaft 12a.

The starter motor 12 is arranged opposing the engine 21 such that the shift of the pinion 13 in the axial direction of the output shaft 12a toward the engine 21 allows the pinion 13 to abut on the ring gear 23 of the engine 21.

The electromagnetic actuator, referred to simply as "actuator", 14 is made up of a plunger 15, a solenoid 16, and a shift lever 17. The plunger 15 is so arranged in parallel to the axial direction of the output shaft 12a of the starter motor 12 as to be shiftable in its length direction parallel to the axial direction of the output shaft 12a.

The solenoid 16 is arranged to surround the plunger 15. One end of the solenoid 16 is electrically connected to a positive terminal of the battery 18 via the relay 19, and the other end thereof is grounded. The shift lever 17 has a one and the other end in its length direction. The one end of the shift lever 17 is pivotally coupled to one end of the plunger 15, and the other end thereof is coupled to the one-way clutch 51. The shift lever 17 is pivoted about a pivot located at its substantially center in the length direction.

The solenoid 16 works to shift the plunger 15 thereinto in its length direction so as to pull it thereinto against the force of return spring (not shown) when energized. The pull-in shift of the plunger 15 pivots the shift lever 17 clockwise in FIG. 1 whereby the pinion 13 is shifted toward the ring gear 23 of the engine 21 via the shift lever 17. This allows the pinion 13 to be meshed with the ring gear 23 for cranking the engine 21. When the solenoid 16 is deenergized, the return spring returns the plunger 15 and the shift lever 17 to their original positions illustrated in FIG. 1 so that the pinion 13 is pulled-out of mesh with the ring gear 23.

The relay 19 is designed as a mechanical relay or a semiconductor relay. The relay 19 has first and second terminals (contacts) electrically connected to the positive terminal of the battery 18 and the one end of the solenoid 16, respectively, and a control terminal electrically connected to the ECU 20.

For example, when an electric signal indicative of switch-on of the relay 19 is sent from the ECU 20, the relay 19 establishes electric conduction between the first and second terminals to thereby allow the battery 18 to supply a DC (Direct Current) battery voltage to the solenoid 16.

Otherwise, when an electric signal indicative of switch-off of the relay 19 in on state is sent from the ECU 20, the relay 19 interrupts the electric conduction between the first and second terminals to thereby disconnect the battery 18 from the solenoid 16.

The relay 25 is designed as, for example, a mechanical relay. For example, the relay 25 includes a solenoid 25a and a switch 25b. The switch 25b is electrically connected between the positive terminal of the battery 18 and the armature 12b of the starter motor 12. The switch 25b is turned on by magnetic force generated when the solenoid 25a is energized, thus establishing electrical conduction between the armature 12a and the battery 18. This turns the armature 12b of the starter motor 12 to thereby rotatably drive the pinion 13.

The switching element 24 has first and second terminals electrically connected to the positive terminal of the battery 18 and the solenoid 25a, respectively, and a control terminal electrically connected to the ECU 20.

For example, when an electric signal, such as a pulse current with a pulse width (pulse duration) corresponding to the energization duration (on period) of the switching element 24, is sent from the ECU 20, the switching element 24 establishes, during on period of the pulse current, electric conduction between the first and second terminals to thereby allow the battery 18 to supply the battery voltage to the solenoid 25a to energize it.

The switching element 24 also interrupts, during on period of the pulse current, the electric conduction between the first and second terminals to thereby disconnect the battery 18 from the solenoid 25a. A duty cycle of the starter motor 12 is represented as a ratio of the on period (pulse width) of the pulse current to the repetition interval (sum of the on and off periods) thereof.

The ECU 20 is designed as, for example, a normal microcomputer circuit consisting of, for example, a CPU, a storage medium 20a including a ROM (Read Only Memory), such as a rewritable ROM, a RAM (Random Access Memory), and the like, an IO (Input and output) interface, and so on.

The storage medium 20a stores therein beforehand various engine control programs.

The ECU 20 is operative to:

receive pieces of data measured by the sensors 59 and sent therefrom; and control, based on the operating conditions of the engine 21 determined by at least some of the received pieces of data measured by the sensors 59, various actuators AC installed in the engine 21 to thereby adjust various controlled variables of the engine 21.

Specifically, the ECU 20 is programmed to:

compute a proper ignition timing for the igniter AC for each cylinder, a proper fuel injection timing and a proper injection quantity for the fuel injector AC for each cylinder;

instruct the igniter AC for each cylinder to ignite an air-fuel mixture in each cylinder at a corresponding computed proper ignition timing; and instruct the fuel injector AC for each cylinder to spray, at a corresponding computed proper injection timing, a corresponding computed proper quantity of fuel into each cylinder.

In addition, the engine control programs stored in the storage medium 20a include an engine automatic stop-and-start routine (program) R1. The ECU 20 repeatedly runs the engine automatic stop-and-start routine R1 in a given cycle during its being energized to carry out an engine automatic stop-and-start control task T, in other words, idle reduction control task T.

Specifically, in accordance with the engine automatic stop-and start control routine R1, the ECU 20 repetitively determines whether an engine automatic stop request occurs based on the data measured by the sensors 59.

When the driver operates the accelerator pedal to fully close the throttle valve or operates the brake pedal to thereby send a deceleration request to the ECU 20 during the vehicle running, the ECU 20 detects the driver's deceleration request operation based on the data measured by the accelerator sensor or the brake sensor. Then, the ECU 20 determines that the engine automatic stop request occurs. Moreover, when the vehicle is stopped, the ECU 20 determines that the engine automatic stop request occurs.

Then, the ECU 20 carries out an automatic stop control of the engine 21. Specifically, the ECU 20 controls the ignition system 53 and/or the fuel injection system 55 to stop the burning of the air-fuel mixture in each cylinder. The stop of the burning of the air-fuel mixture in each cylinder of the engine 21 means the automatic stop of the engine 21.

After the automatic stop of the engine 21, in accordance with the engine automatic stop-and start control routine R1, the ECU 20 determines whether an engine restart request occurs based on the data measured by the sensors 59 and data inputted from another device installed in the vehicle.

When the engine automatic stop request is released during the vehicle running, for example, the throttle valve is shifted from the fully close position, the ECU 20 determines that the engine restart request occurs. Moreover, when the driver, for example, releases the brake pedal or operates the shift lever 61 in preparation to the restart of the vehicle during the vehicle being stopped, the ECU 20 determines that the engine restart request occurs. In addition, the driver, for example, depresses the accelerator pedal to restart the vehicle, the ECU 20 determines that the engine restart request occurs. Then, the ECU 20 runs an engine restart control subroutine R2 included in the engine automatic stop-and start control routine R1 and described hereinafter to thereby automatically restart the engine 21.

Figure 2:
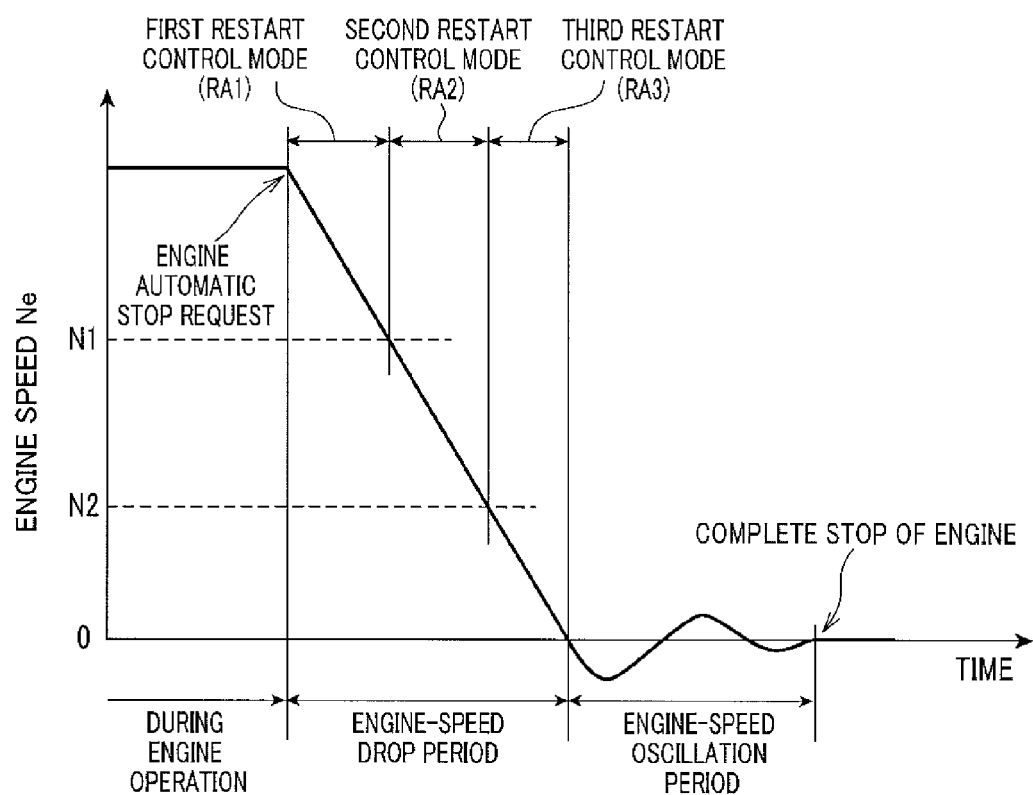
FIG. 2 is a timing chart schematically illustrating a relationship between the behavior of an engine speed and the first to third engine restart control modes according to the first embodiment.

Specifically, referring to FIG. 2, the ECU 20 is programmed to select one of predetermined first to third restart control modes based on a speed Ne of the engine 20 in rpm (revolution per minute), referred to simply as "engine speed", after the automatic stop of the engine 21.

After the automatic stop of the engine 21, the ECU 20 monitors the engine speed Ne using a map.

In the first embodiment, the storage medium 20a of the ECU 20 stores therein a map M1 designed as, for example, a data table or a program. The map M1 represents a function (relationship) between a variable of the engine speed Ne and a variable of the elapsed time since the occurrence of the engine automatic stop request. The function can have been determined based on data obtained by tests using the engine 21 or its computer model. The function also can have been determined based on design data of the engine 21. The function usually represents that the engine speed Ne is reduced with increase in the elapsed time since the occurrence of the engine automatic stop request.

Specifically, the ECU 20 measures the elapsed time since the occurrence of the engine automatic stop request using, for example, at least one timer or at least one counter installed in the CPU. The ECU 20 references the map M1 using, as a key, the measured value of the elapsed time since the occurrence of the engine automatic stop request. Based on a result of the reference, the ECU 20 retrieves a value of the engine speed Ne corresponding to the measured value of the elapsed time since the occurrence of the engine automatic stop request, thus monitoring the engine speed Ne.

Referring to FIG. 2, after the automatic stop of the engine 21 in response to the occurrence of the engine automatic stop request, the engine speed Ne linearly drops over a period of time, referred to as "engine-speed drop period". When the engine speed Ne reaches zero corresponding the end of the engine-speed drop period, the behavior of the engine speed Ne oscillates in the direction of its normal positive rotation and its negative rotation over a period of time, referred to as "engine-speed oscillation period". After the engine-speed oscillation period, the engine speed Ne becomes zero so that the engine 21 is completely stopped. The negative oscillation of the engine speed is due to the compression pressure in each cylinder immediately before the compression top dead center (TDC). If the pinion 13 were tried to be engaged with the ring gear 23 during the engine speed Ne (rotational speed of the ring gear 23) positively and negatively oscillating, the pinion 13 would hit the negatively oscillating ring gear 23. This would cause a large impact on the pinion 13, and therefore, would damage the pinion 13 (starter 12) and cause high level noises.

Date indicative of the waveform of the behavior of the engine speed Ne after the automatic stop of the engine 21 including the engine-speed drop period and the engine-speed oscillation period of the engine 21 has been measured by tests using the engine 21 or its computer model. The data has been stored in the storage medium 20a of the ECU 20.

During the engine-speed drop period by the automatic stop of the engine 21, when the engine restart request occurs with the monitored engine speed Ne being within a first speed range RA1 higher than a first preset speed N1, such as 500 rpm, the ECU 20 determines that the engine 20 is allowed to be restarted without cranking by the starter 11.

Thus, the ECU 20 shifts its operation mode to the first restart control mode, and carries out a first restart control task in the first restart control mode.

Specifically, in the first restart control mode, the ECU 20 controls the ignition system 53 and/or the fuel injection system 55 to restart the ignition and/or the fuel-injection for each cylinder without cranking the crankshaft 22 by the starter it, thus automatically restarting the engine 21.

This achieves an advantage of restarting the burning of the air-fuel mixture in each cylinder of the engine 21 in immediate response to the occurrence of the engine restart request to thereby immediately restart the engine 21. In addition, because the need for cranking the engine 21 is eliminated, it is possible to eliminate the power consumption of the starter 11, and the need for the engagement of the pinion 13 with the ring gear 23 with the difference between their rotational speeds being high, thus preventing or reducing noises and impacts from occurring due to the rotational speed difference.

During the engine-speed drop period by the automatic stop of the engine 21, when the engine restart request occurs with the monitored engine speed Ne being within a second speed range RA2 equal to or lower than the first preset speed N1 and higher than a second preset speed N2, such as 250 rpm, the ECU 20 determines that the pinion 13 is not smoothly meshed with the ring gear 23 until the rotational speed of the pinion 13 becomes close to that of the ring gear 23. This is because the RPM of the ring gear 23 is relatively high.

Thus, the ECU 20 shifts its operation mode to the second restart control mode, and carries out a second restart control task in the second restart control mode.

Specifically, in the second restart control mode, the ECU 20 drives the switching element 24 to turn it on, thus energizing the solenoid 25a. This rotatably drives the starter motor 12 to thereby rotate the pinion 13.

The ECU 20 monitors the rotational speed of the pinion 13 using a map. In the first embodiment, the storage medium 20a of the ECU 20 stores therein a map M2 designed as, for example, a data table or a program.

The map M2 represents a variable of the rotational speed of the pinion 13 as a function of: the elapsed time (energization duration) since the start of the energization of the starter motor 12, and the amount of current to be applied to the starter motor 12 (switching element) 24, such as the duty cycle of the PWM signal to be applied to the switching element 24. The function can have been determined based on data obtained by tests using the engine starting system 1 or its computer model. The function also can have been determined based on design data of the engine starting system 1. The function usually represents that the rotational speed of the starter motor 12 is increased with increase in the elapsed time since the start of the energization of the starter motor 12 and with increase in the current to be applied to the starter motor 12.

Specifically, the ECU 20 measures the elapsed time since the start of the energization of the starter motor 12 using, for example, the at least one timer or the at least one counter installed in the CPU. The ECU 20 references the map M2 using, as a key, the measured value of the elapsed time since the start of the energization of the starter motor 12 and the duty cycle of the starter motor 12. Based on a result of the reference, the ECU 20 retrieves a value of the rotational speed of the pinion 13 corresponding to the measured value of the elapsed time since the start of the energization of the stator motor 12 and the duty cycle thereof, thus monitoring the rotational speed of the pinion 13.

Thereafter, when the monitored rotational speed of the pinion 13 becomes close to that of the ring gear 23, the ECU 20 drives the electromagnetic actuator 14 to shift the rotating pinion 13 toward the ring gear 23 so that the rotating pinion 13 is meshed with the ring gear 23. The engagement of the rotating pinion 13 with the ring gear 23 cranks the crankshaft 22 of the engine 21 to thereby restart the engine 21.

Figure 3:
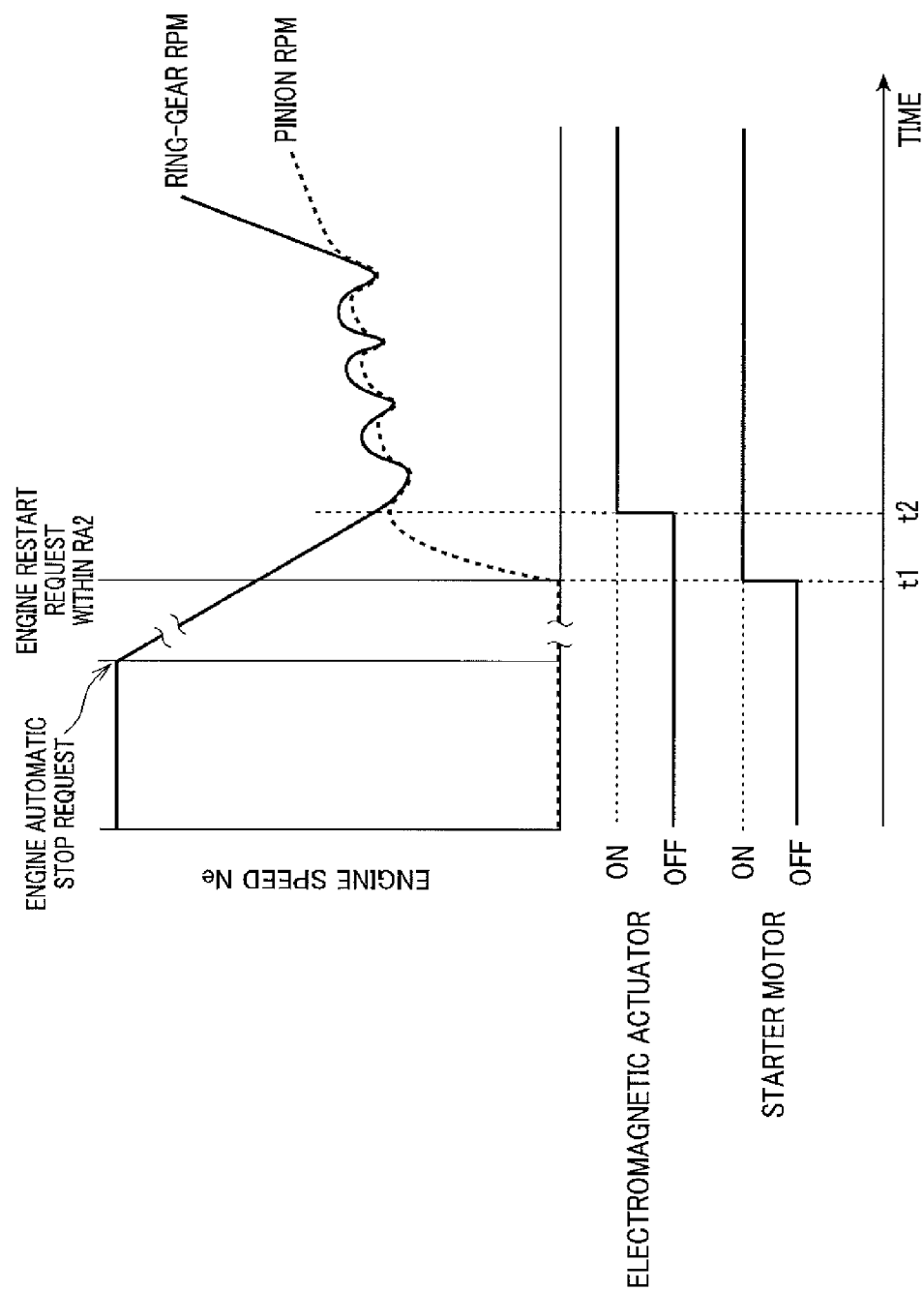
FIG. 3 is a timing chart schematically illustrating driving timings of an electromagnetic actuator and a starter motor illustrated in FIG. 1 when an ECU operates in the second engine restart control mode according to the first embodiment.

More specifically, referring to FIG. 3, when the engine restart request occurs at time t1 with the monitored engine speed Ne being within the second speed range RA2, the ECU 20 shifts its operation mode to the second restart control mode, and rotatably drives the starter motor 12 to thereby rotate the pinion 13.

Thereafter, the ECU 20 monitors the difference in rotational speed between the ring gear 23 and the pinion 13, and when the monitored difference in rotational speed between the ring gear 23 and the pinion 13 falls within a range of ±250 rpm, preferably ±200 rpm, at time t2, the ECU 20 determines that the rotational speed of the pinion 13 becomes close to that of the ring gear 23. In other words, when the monitored difference in rotational sped between the ring gear 23 and the pinion 13 falls within a range of ±250 rpm, preferably ±200 rpm, at time t2, the ECU 20 determines that the pinion 13 is allowed to rotate with the ring gear 23 when the pinion 13 abuts on the ring gear 23.

Then, the ECU 20 drives the electromagnetic actuator 14 to shift the rotating pinion 13 toward the ring gear 23 so that the rotating pinion 13 abuts on the ring gear 23 and thereafter is meshed with the ring gear 23. The engagement of the rotating pinion 13 with the ring gear 23 cranks the crankshaft 22 of the engine 21 to thereby restart the engine 21.

Note that the difference in rotational speed between the ring gear 23 and the pinion 13 means the difference in rotational speed between the ring gear 23 and the pinion 13 when the rotational speed of the pinion 13 is corrected such that a diameter of an addendum circle of the ring gear 23 is in agreement with that of the addendum circle of the pinion 13.

The engine restart operations in the second restart control mode reduce the delay from the occurrence of the engine restart request to the restart of the engine 21 while smoothly engaging the pinion 13 with the ring gear 23 to thereby prevent or reduce noises and impacts due to the engagement.

In addition, because it is unnecessary to completely synchronize the rotational speed of the pinion 13 with the rotational speed of the ring gear 23 in order to engage the pinion 13 with the ring gear 23, the measurement accuracy of the rotational speeds of the pinion 13 and the ring gear 23 need not be high. Thus, as described above, the rotational speed of the ring gear 23 and the rotational speed of the pinion 13 can be measured by the computer estimations based on the maps in place of a crank angle sensor for measuring the rotational speed of the ring gear 23 and a rotational speed sensor for measuring the rotational speed of the pinion 13. Because the crank angle sensor and the rotational angle sensor are expensive, the engine starting system 1 meets the low-cost requirements for vehicles as recent important technical requirements.

For example, in the first embodiment, the diameter of the addendum circle of the ring gear 23 is set to 300 mm, and the diameter of the addendum circle of the pinion 13 is set to 30 mm. Thus, when the rotational speed of the ring gear 23 is 300 rpm and the rotational speed of the pinion 13 is 1000 rpm, the difference between the rotational speed of the ring gear 23 and the corrected rotational speed of the pinion 13 is calculated as 200 rpm.

Because the diameter of the addendum circle of the ring gear 23 is 300 mm and the rotational speed thereof is 300 rpm, a peripheral speed on a pitch circle of the ring gear 23 becomes approximately 4.7 meters per second. Note that the pitch circle of the ring gear 23 represents an imaginary circle that is made rolling contact with the gear of the pinion 13.

Similarly, because the diameter of the addendum circle of the pinion 13 is 30 mm and the rotational speed thereof is 1000 rpm, a peripheral speed on a pitch circle of the pinion 13 becomes approximately 1.6 meters per second. Note that the pitch circle of the pinion 13 represents an imaginary circle that is made rolling contact with the ring gear 23.

From the viewpoint, the difference between the peripheral speed on the pitch circle of the ring gear 23 and that on the pitch circle of the pinion 13 becomes approximately 3.1 meters per second. Thus, the fact that the difference between the rotational speed of the ring gear 23 and that of the pinion 13 becomes within ±200 rpm means the fact that the difference between the peripheral speed on the pitch circle of the ring gear 23 and that on the pitch circle of the pinion 13 becomes within ±3.1 meters per second.

The inventors of the present application carried out tests for measurement of sound pressure levels when the ring gear 23 and the pinion 13 were meshed with each other while varying the difference between the rotational speed of the ring gear 23 and that of the pinion 13.

Specifically, the inventors measured a sound pressure level when the ring gear 23 with the diameter of its addendum circle of 300 mm and the pinion 13 with the diameter of its addendum circle of 30 mm were meshed with each other for each value of the varied differences between the rotational speed of het ring gear 23 and that of the pinion 13. The sound pressure level when the ring gear 23 and the pinion 13 were meshed with each other was measured with a microphone located at a distance of 15 cm from the meshed position.

Figure 4A:
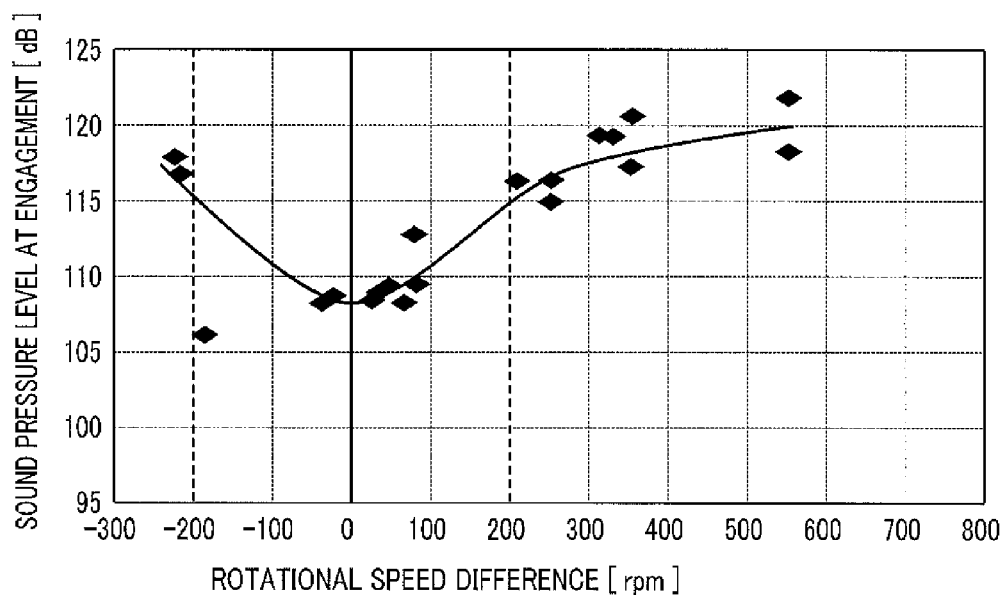
FIG. 4A is a graph schematically illustrating the result of tests for measurement of sound pressure levels when a ring gear and a pinion were meshed with each other while varying the difference between the rotational speed of the ring gear and that of the pinion according to the first embodiment.
Figure 4B:
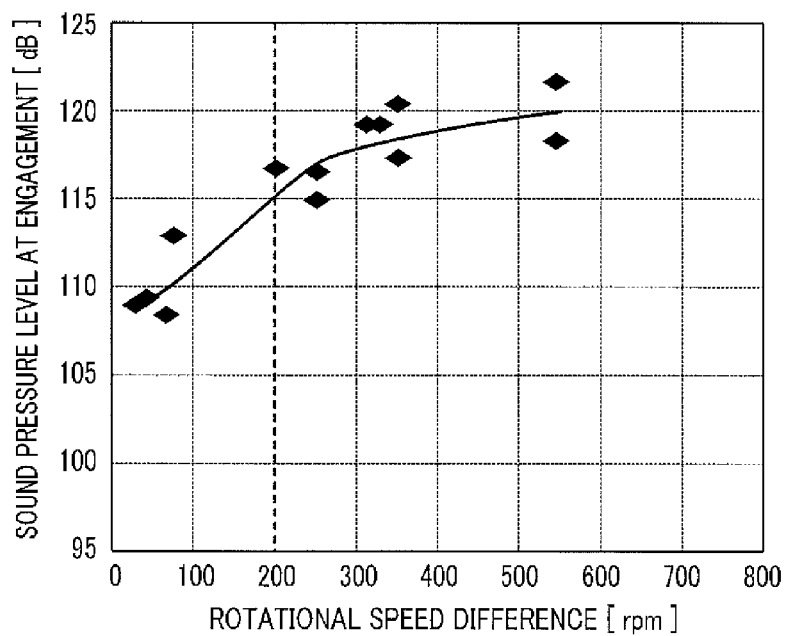
FIG. 4B is a graph schematically illustrating part of the result of the tests illustrated in FIG. 4A.

FIGS. 4A and 4B show the result of the tests in graph format. The horizontal axis of each of FIGS. 4A and 4B represents the difference between the rotational speed of het ring gear 23 and that of the pinion 13 in rpm, and the vertical axis represents the measured sound pressure level in dB.

Each of the positive values of the varied differences in RPM between the ring gear 23 and the pinion 13 represent that the ring gear 23 is higher than that of the pinion 13 in rpm, and each of the negative values of the varied differences in RPM between the ring gear 23 and the pinion 13 represent that the ring gear 23 is lower than that of the pinion 13 in rpm. FIG. 4B particularly illustrates the result of the tests for each of the positive values of the varied differences in RPM between the ring gear 23 and the pinion 13.

FIGS. 4A and 4B demonstrate that, when the difference between the rotational speed of het ring gear 23 and that of the pinion 13 is maintained within ±250 rpm, preferably within ±200 rpm, the sound pressure levels at the engagement of the pinion 13 with the ring gear 23 are sufficiently reduced. In other words, FIGS. 4A and 4B demonstrate that, when the difference between the peripheral speed of het ring gear 23 and that of the pinion 13 is preferably maintained within ±3.1 meters per second, the sound pressure levels at the engagement of the pinion 13 with the ring gear 23 are sufficiently reduced.

In the first embodiment, referring to FIG. 1, the starter 11 is configured such that the one-way clutch 51 is provided in helical spline engagement with the outer circumference of the one end of the output shaft 12a. The one-way clutch 51 works to transfer rotational motion supplied from the starter motor 12 to the pinion 13 without transferring rotational motion supplied from the pinion 13 to the starter motor 12.

The ECU 20 according to the first embodiment can be modified to determine that the pinion 13 is allowed to rotate with the ring gear 23 when the pinion 13 abuts on the ring gear 23 when:

the rotational speed of the ring gear 23 is higher than that of the pinion 13; and the difference in rotational speed between the ring gear 23 and the pinion 13 is equal to or lower than a preset value of, for example, 200 rpm.

As described above, the fact that difference in rotational speed between the ring gear 23 and the pinion 13 is equal to or lower than 200 rpm means the fact that the difference between the peripheral speed on the pitch circle of the ring gear 23 and that on the pitch circle of the pinion 13 is equal to or lower than 3.1 meters per second.

With the configuration of the modified ECU 20, it is possible to reduce the impact caused when the pinion 13 abuts on the ring gear 23 because the one-way clutch 51 idles. Thereafter, friction between the ring gear 23 and the pinion 13 gradually reduces the RPM of the ring gear 23 with increase in the RPM of the pinion 13 so that the pinion 13 is meshed with the ring gear 23.

When the difference in rotational speed between the ring gear 23 and the pinion 13 becomes substantially zero, the one-way clutch 51 is locked so that the one-way clutch 51 starts the transfer of the rotational motion supplied from the ring gear 23 to the pinion 13. The actions of the pinion 13, the one-way clutch 51, and the ring gear 23 allow the pinion 13 to be smoothly meshed with the ring gear 23. Thus, the impact on the elements of the starter 11 due to the engagement of the pinion 13 with the ring gear 23 is reduced, making it possible to give enough strength to the elements of the starter 11.

During the engine-speed drop period by the automatic stop of the engine 21, when the engine restart request occurs with the monitored engine speed Ne being within a third speed range RA3 equal to or lower than the second preset speed N2 and higher than a third preset speed N3, the ECU 20 determines that the pinion 13 is allowed to be smoothly meshed with the ring gear 23 without bringing the rotational speed of the pinion 13 closer to that of the ring gear 23. This is because the RPM of the ring gear 23 is relatively low.

Thus, the ECU 20 shifts its operation mode to the third restart control mode, and carries out a third restart control task in the third restart control mode.

Specifically, in the third restart control mode, the ECU 20 drives the electromagnetic actuator 14 to shift the rotating pinion 13 toward the ring gear 23 so that the rotating pinion 13 is meshed with the ring gear 23. After or during the engagement of the pinion 13 with the ring gear 23, the ECU 20 drives the switching element 24 to turn it on, thus energizing the solenoid 25a. This rotatably drives the starter motor 12 to rotate the pinion 13. This cranks the crankshaft 22 of the engine 21 to thereby restart the engine 21.

More specifically, referring to FIG. 5, when the engine restart request occurs at time t3 with the monitored engine speed Ne being within the third speed range RA3, the ECU 20 shifts its operation mode to the third restart control mode, and drives the electromagnetic actuator 14 to shift the pinion 13 toward the ring gear 23 so that the pinion 13 abuts on the ring gear 23 and thereafter is meshed with the ring gear 23.

At the point of time 4 when the engagement of the pinion 13 with the ring gear 23 has been completed or during the engagement of the pinion 13 with the ring gear 23, the ECU 20 rotatably drives the starter motor 12 to thereby rotate the pinion 13. This cranks the crankshaft 22 of the engine 21 to thereby restart the engine 21.

The engine restart operations in the third restart control mode omit the operations to bring the rotational speed of the pinion 13 closer to that of the ring gear 23 while smoothly engaging the pinion 13 with the ring gear 23 to thereby prevent or reduce noises and impacts due to the engagement. The omission of the operations to bring the rotational speed of the pinion 13 closer to that of the ring gear 23 immediately starts the cranking of the crankshaft 22 by the starter 11 so as to immediately restart the engine 21 with reduction in the power consumption of the starter 11.

Next, an engine restart control task to be executed by the ECU 20 in accordance with the engine restart control subroutine R2 will be described hereinafter with reference to FIG. 6. The engine restart control subroutine R2 is repeatedly called in a given cycle during execution of the engine automatic stop-and-start control routine R1.

When the engine restart control subroutine R2 is called, the ECU 20 determines whether the engine 21 is under the automatic stop control in step 101. In other words, the ECU 20 determines whether the called timing is before the occurrence of the engine restart request and after the stop of burning of the air-fuel mixture in each cylinder in step 101.

Upon determining that the engine 21 is not under the automatic stop control (NO in step 101) the ECU 20 exits the engine restart control subroutine R2 without executing the following steps 102 to 110, and returns to the main routine R1.

Otherwise, upon determining that the engine 21 is under the automatic stop control (YES in step 101), the ECU 20 determines whether the engine restart request occurs in step 102.

Upon determining that no engine restart requests occur (NO in step 102), the ECU 20 exits the engine restart control subroutine R2, and returns to the main routine R1.

Otherwise, upon determining that the engine restart request occurs (YES in step 102), the ECU 20 proceeds to step 103.

In step 103, the ECU 20 determines whether the engine speed Ne is higher than the first preset speed N1 to thereby determine whether the engine speed Ne is within the first speed range RA1.

The first preset speed N1 can be selected from, for example, the range of 300 to 700 rpm, and, in the first embodiment, is set to 500 rpm set forth above. During the engine-speed drop period by the automatic stop of the engine 21, when the engine speed Ne is higher than the first preset speed N1 selected from the range of 300 rpm to 700 rpm, restart of the burning of the air-fuel mixture in each cylinder by the ignition and/or the fuel-injection allows the engine 21 to restart without cranking the crankshaft 22 by the starter 11.

That is, the first speed range RA1 higher than the first preset speed N1 selected from the range of 300 rpm to 700 rpm is a range in which the restarting of the ignition and/or the fuel-injection for each cylinder without cranking the crankshaft 22 by the starter 11 allows the engine 21 to be restarted.

Specifically, when it is determined that the engine speed Ne is higher than the first preset speed N1 so that the engine restart request occurs with the engine speed Ne being within the first speed range RA1 (YES in step 103), the ECU 20 determines that the engine 20 is allowed to be restarted without cranking by the starter 11.

Thus, the ECU 20 shifts its operation mode to the first restart control mode and carries out the first restart control task in step 104.

Specifically, in step 104, the ECU 20 controls the ignition system 53 and/or the fuel injection system 55 to restart the ignition and/or the fuel-injection for each cylinder without cranking the crankshaft 22 by the starter 11, thus automatically restarting the engine 21 in step 104a.

Thereafter, in step 105, the ECU 20 determines whether the restart of the engine 21 has been completed. For example, in step 105, the ECU 20 determines whether the engine speed Ne exceeds a preset speed for determination of restart completion. Upon determining that the engine speed Ne does not exceed the preset speed for determination of restart completion (NO in step 105), the ECU 20 determines that the restart of the engine 21 has not been completed yet. Then, the ECU 20 returns to step 103, and repeatedly carries out the operations in steps 103 to 105 until the determination in step 103 is NO or the determination in step 105 is YES.

When the determination in step 105 is YES, the ECU 20 determines that the restart of the engine 21 has been completed, and therefore, exits the engine restart control subroutine R2.

Otherwise, when it is determined that the engine speed Ne is equal to or lower than the first preset speed N1 (NO in step 103), the ECU 20 proceeds to step 106. In step 106, the ECU 20 determines whether the engine speed Ne is higher than the second preset speed N2 to thereby determine whether the engine speed Ne is within the second speed range RA2 or the third speed range RA3.

The second preset speed N2 can be selected from, for example, the range of 50 rpm to 450 rpm, and, in the first embodiment, is set to 250 rpm set forth above. During the engine-speed drop period by the automatic stop of the engine 21, when the engine speed Ne is equal to or lower than the second preset speed N2 selected from the range of 50 rpm to 450 rpm, the pinion 13 can be smoothly meshed with the ring gear 23 without the rotational speed of the pinion 13 being brought closer to that of the ring gear 23.

That is, the third speed range RA3 equal to or lower than the second preset speed N2 selected from the range of 50 rpm to 450 rpm is a range in which the pinion 13 is allowed to be smoothly engaged with the ring gear 23 without the rotational speed of the pinion 13 being brought closer to that of the ring gear 23.

Upon determining that the engine speed Ne is higher than the second preset speed N2 so that the engine restart request occurs with the engine speed Ne being within the second speed range RA2 (YES in step 106), the ECU 20 determines that the pinion 13 is not smoothly meshed with the ring gear 23 until the rotational speed of the pinion 13 becomes close to that of the ring gear 23 because the RPM of the ring gear 23 is relatively high. Then, the ECU 20 proceeds to step 107, shifts its operation mode to the second restart control mode, and carries out the second restart control task in step 107.

Specifically, the ECU 20 rotatably drives the starter motor 12 to thereby rotate the pinion 13 in step 107a.

After the difference in rotational speed between the ring gear 23 and the pinion 13 falls within a range of ±250 rpm, preferably ±200 rpm so that the monitored rotational speed of the pinion 13 becomes close to that of the ring gear 23, the ECU 20 drives the electromagnetic actuator 14 to shift the rotating pinion 13 toward the ring gear 23 so that the rotating pinion 13 is meshed with the ring gear 23 in step 107b. The engagement of the rotating pinion 13 with the ring gear 23 cranks the crankshaft 22 of the engine 21 to thereby restart the engine 21.

Next, the ECU 20 proceeds to step 108, and determines whether the restart of the engine 21 has been completed in step 108 in the same manner as step 105.

Upon determining that the restart of the engine 21 has been completed (YES in step 108), the ECU 20 exits the engine restart control subroutine R2 and returns to the main routine R1.

Otherwise, upon determining that the engine speed Ne does not exceed the preset speed for determination of restart completion (NO in step 108), the ECU 20 determines that the restart of the engine 21 has not been completed yet. Then, the ECU 20 proceeds to step 109.

Upon determining that the engine speed Ne is equal to or lower than the second preset speed N2 so that the engine restart request occurs with the engine speed Ne being within the third speed range RA3 (NO in step 106), the ECU 20 determines that the pinion 13 is allowed to be smoothly meshed with the ring gear 23 without the rotational speed of the pinion 13 being brought closer to that of the ring gear 23 because the RPM of the ring gear 23 is relatively low. Then, the ECU 20 proceeds to step 109.

In step 109, the ECU 20 shifts its operation mode to the third restart control mode, and carries out the third restart control task in step 109.

Specifically, in step 109a, the ECU 20 drives the electromagnetic actuator 14 to shift the pinion 13 toward the ring gear 23 so that the pinion 13 is meshed with the ring gear 23. In step 109b, after or during the engagement of the pinion 13 with the ring gear 23, the ECU 20 rotatably drives the starter motor 12 to rotate the pinion 13. This cranks the crankshaft 22 of the engine 21 to thereby restart the engine 21.

Next, the ECU 20 proceeds to step 110, and determines whether the restart of the engine 21 has been completed in step 110 in the same manner as step 105.

Upon determining that the restart of the engine 21 has not been completed yet (NO in step 110), the ECU 20 determines that the restart of the engine 21 has not been completed yet. Then, the ECU 20 returns to step 109 and repeatedly executes the operations in steps 109 and 110.

Otherwise, upon determining that the restart of the engine 21 has been completed (YES in step 110), the ECU 20 exits the engine restart control subroutine R2 and returns to the main routine R1.

As described above, the engine starting system 1 according to the first embodiment is designed to, during the engine-speed drop period by the automatic stop of the engine 21, carry out:

the first restart control task when the engine restart request occurs with the engine speed Ne being within the first speed range RA1;

the second restart control task when the engine restart request occurs with the engine speed Ne being within the second speed range RA2; and the third restart control task when the engine restart request occurs with the engine speed Ne being within the third speed range RA3.

The first restart control task restarts the ignition and/or the fuel-injection for each cylinder without cranking the crankshaft 22 by the starter 11, thus automatically restarting the engine 21.

After the monitored rotational speed of the pinion 13 becomes close to that of the ring gear 23, the second restart control task drives the electromagnetic actuator 14 to mesh the pinion 13 with the ring gear 23 to thereby crank the crankshaft 22 of the engine 21 to thereby restart the engine 21.

The third restart control task drives the electromagnetic actuator 14 to mesh the pinion 13 with the ring gear 23. After or during the engagement of the pinion 13 with the ring gear 23, rotatably drives the starter motor 12 with the pinion 13 to crank the crankshaft 22 of the engine 21, thus restarting the engine 21.

The configuration of the engine starting system 1 makes it possible to carry out any one of the first to third engine restart tasks that is most suitable for the engine speed Ne at the moment when the engine restart request occurs during the engine-speed drop period. This achieves an advantage of preventing or reducing noises and impacts from occurring due to the engagement of the pinion 13 with the ring gear 23 and an advantage of reducing the power consumption of the starter 11.

In addition, the engine starting system 1 according to the first embodiment is designed to estimate the engine speed (rotational speed of the ring gear 23) based on the elapsed time since the occurrence of the engine automatic stop request or the stop of the burning of the air-fuel mixture. This eliminates the need to provide a crank angle sensor with a high cost for measuring the engine speed with high accuracy. Similarly, the engine starting system 1 according to the first embodiment is designed to estimate the rotational speed of the pinion 13 based on the energization duration of the starter motor 12 and the amount of current to be applied thereto. This eliminates the need to provide a rotational speed sensor with a high cost for measuring the rotational speed of the pinion 13.

Thus, the engine starting system 1 according to the first embodiment meets the low-cost requirements for vehicles as recent important technical requirements.

Second Embodiment

A starting system for an internal combustion engine installed in a vehicle according to the second embodiment of the present invention will be described hereinafter with reference to FIG. 7.

The hardware and software structures of the engine starting system according to the second embodiment are substantially identical to those of the engine starting system 1 according to the first embodiment except for the following points. So, like parts between the engine starting systems according to the first and second embodiments, to which like reference characters are assigned, are omitted or simplified in description.

Figure 7:
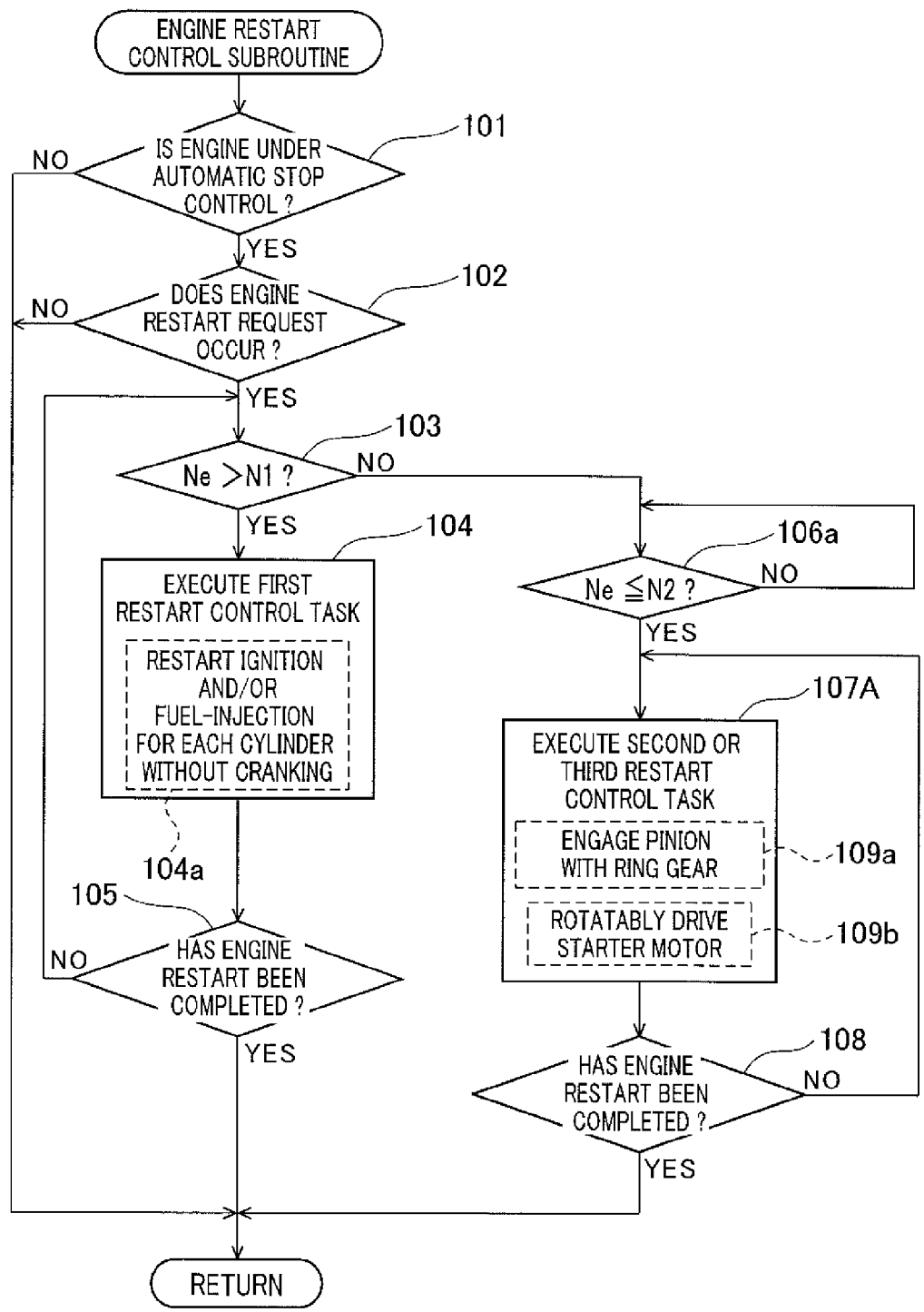
FIG. 7 is a flowchart schematically illustrating an engine restart control subroutine according to a second embodiment of the present invention.

The ECU 20 of the engine starting system according to the second embodiment is configured to execute an engine restart control subroutine illustrated in FIG. 7, which is different from the engine restart control subroutine R2.

Figure 6:
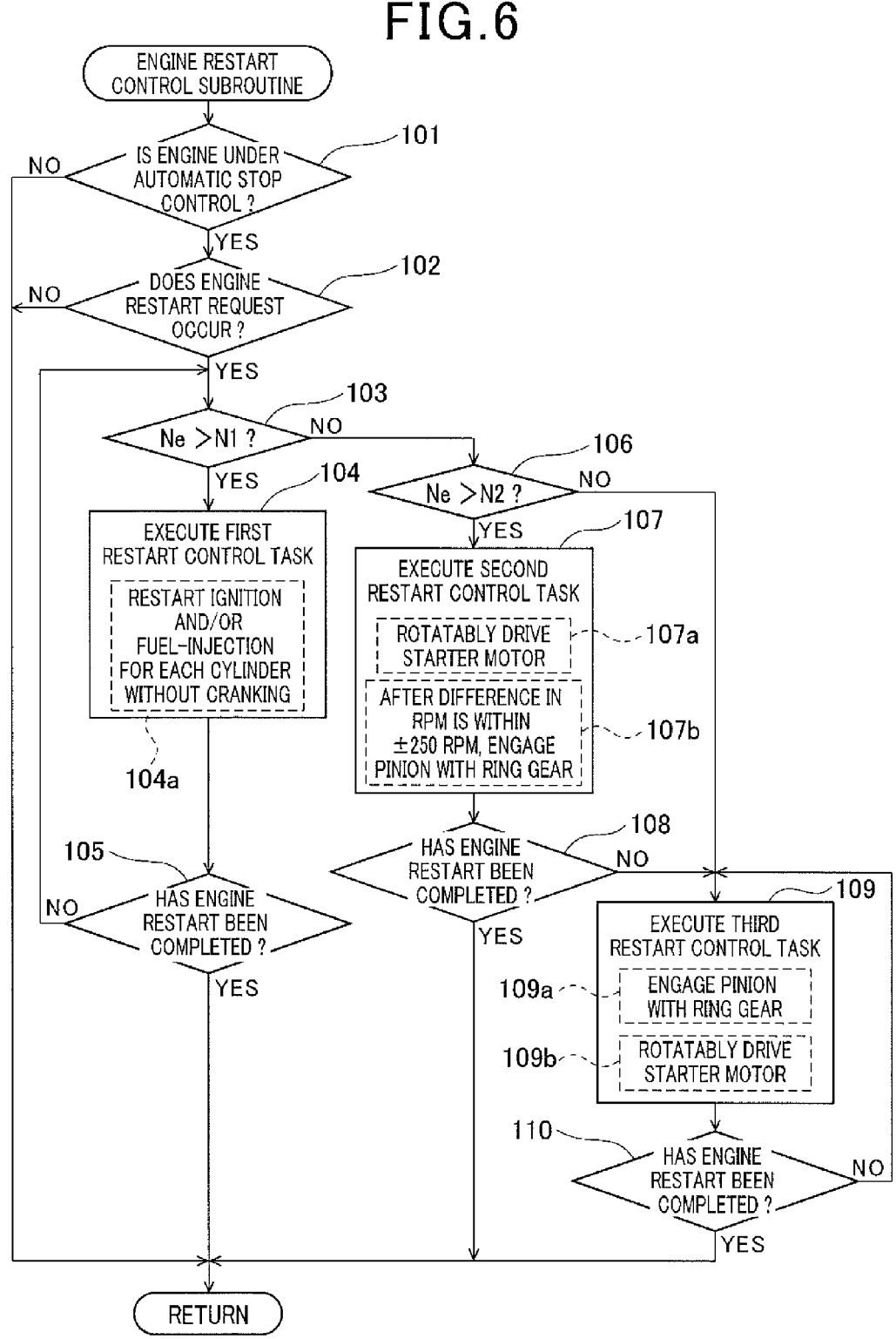
FIG. 6 is a flowchart schematically illustrating an engine restart control subroutine according to the first embodiment.

Specifically, upon determining that the engine speed Ne is higher than the second preset speed N2 so that the engine restart request occurs with the engine speed Ne being within the second speed range RA2, the ECU 20 shifts its operation mode to the second restart control mode, and carries out a second restart control task different from the second restart control task in step 107 of FIG. 6.

The second restart control task according to the second embodiment is designed to wait for the cranking of the crankshaft 22 by the starter 11 even if the engine restart request occurs. Thereafter, when the engine speed Ne falls within the third speed range RA3, the second restart control task according to the second embodiment is designed to drive the electromagnetic actuator 14 to mesh the pinion 13 with the ring gear 23, and, after or during the engagement of the pinion 13 with the ring gear 23, rotatably drive the starter motor 12 with the pinion 13 to crank the crankshaft 22 of the engine 21, thus restarting the engine 21.

Next, an engine restart control task to be executed by the ECU 20 in accordance with the engine restart control subroutine according to the second embodiment illustrated in FIG. 7 will be described hereinafter. The engine restart control subroutine according to the second embodiment is repeatedly called in a given cycle during execution of the engine automatic stop-and-start control routine R1.

When the engine restart control subroutine is called, the ECU 20 determines whether the engine restart request occurs during the engine 21 being under the automatic stop control in steps 101 and 102.

Upon determining that the engine restart request occurs (YES in step 102), the ECU 20 proceeds to step 103 and determines whether the engine speed Ne is higher than the first preset speed N1 to thereby determine whether the engine speed Ne is within the first speed range RA1.

When it is determined that the engine speed Ne is higher than the first preset speed N1 so that the engine restart request occurs with the engine speed Ne being within the first speed range RA1 (YES in step 103), the ECU 20 controls the ignition system 53 and/or the fuel injection system 55 to restart the ignition and/or the fuel-injection for each cylinder without cranking the crankshaft 22 by the starter 11, thus automatically restarting the engine 21 in steps 104 and 105.

Otherwise, when it is determined that the engine speed Ne is equal to or lower than the first preset speed N1 (NO in step 103), the ECU 20 proceeds to step 106a. In step 106a, the ECU 20 determines whether the engine speed Ne is equal to or lower than the second preset speed N2.

When it is determined that the engine speed Ne is higher than the second preset speed N2 so that the engine restart request occurs with the engine speed Ne being within the second speed range RA2 (NO in step 106a), the ECU 20 waits for the cranking of the crankshaft 22 by the starter 11 while repeatedly determining whether the engine speed Ne is equal to or lower than the second preset speed N2.

As a result of one or more executions of the determining operation in step 106a, when it is determined that the engine speed Ne is equal to or lower than the second preset speed N2 so that the engine speed Ne decreases within the third speed range RA3 (YES in step 106a), the ECU 20 proceeds to step 107A.

In step 107A, the ECU 20 shifts its operation mode to the second restart control mode, and carries out the second restart control task according to the second embodiment.

Specifically, in step 107A, the ECU 20 drives the electromagnetic actuator 14 to shift the pinion 13 toward the ring gear 23 so that the pinion 13 is meshed with the ring gear 23 as well as the operation in step 109a. In step 107A, after or during the engagement of the pinion 13 with the ring gear 23, the ECU 20 rotatably drives the starter motor 12 to rotate the pinion 13 as well as the operation in step 109b. This cranks the crankshaft 22 of the engine 21 to thereby restart the engine 21.

Otherwise, when it is determined that the engine speed Ne is equal to or lower than the second preset speed N2 at the occurrence of the engine restart request, in other words, the engine restart request occurs with the engine speed Ne being within the third speed range RA3 (YES in step 106a), the ECU 20 proceeds to step 107A.

In step 107A, the ECU 20 shifts its operation mode to the third restart control mode, and carries out the third restart control task.

Specifically, in step 107A, the ECU 20 drives the electromagnetic actuator 14 to shift the pinion 13 toward the ring gear 23 so that the pinion 13 is meshed with the ring gear 23 as well as the operation in step 109a. In step 107A, after or during the engagement of the pinion 13 with the ring gear 23, the ECU 20 rotatably drives the starter motor 12 to rotate the pinion 13 as well as the operation in step 100. This cranks the crankshaft 22 of the engine 21 to thereby restart the engine 21.

Next, the ECU 20 proceeds to step 108, and determines whether the restart of the engine 21 has been completed in step 108 in the same manner as step 105.

Upon determining that the engine speed Ne does not exceed the preset speed for determination of restart completion (NO in step 108), the ECU 20 determines that the restart of the engine 21 has not been completed yet. Then, the ECU 20 returns to step 107a and continuously executes the corresponding second or third engine restart control task.

As a result of one or more continuous executions of the corresponding second or third engine restart control task, when it is determined that the restart of the engine 21 has been completed, the ECU 20 exits the engine restart control subroutine according to the second embodiment.

As described above, the engine starting system according to the second embodiment is designed to wait for the cranking of the crankshaft 22 by the starter 11 even if the engine restart request occurs with the engine speed Ne being within the second speed range RA2.

Thereafter, when the engine speed Ne falls within the third speed range RA3, the engine starting system according to the second embodiment is designed to drive the electromagnetic actuator 14 to mesh the pinion 13 with the ring gear 23, and, after or during the engagement of the pinion 13 with the ring gear 23, rotatably drive the starter motor 12 with the pinion 13 to crank the crankshaft 22 of the engine 21, thus restarting the engine 21.

Thus, even if the engine restart request occurs with the engine speed Ne being within the second speed range RA2, it is possible to omit the operations to bring the rotational speed of the pinion 13 closer to that of the ring gear 23, thus simplifying the engine restart control task while reducing the power consumption of the starter 11. As described above, the engine starting system according to the second embodiment starts the cranking of the crankshaft 22 by the starter 11 after a given time has elapsed since the occurrence of the engine restart request with the engine speed Ne being within the second speed range RA2. Because it is shown empirically that the time required for the engine speed Ne passes through the second speed range RA2 is relatively short, it is possible to maintain, within an allowable range, the delay time elapsed from the occurrence of the engine restart request to the restart of the engine 21.

Third Embodiment

A starting system for an internal combustion engine installed in a vehicle according to the third embodiment of the present invention will be described hereinafter with reference to FIGS. 8 and 9.

The hardware and software structures of the engine starting system according to the third embodiment are substantially identical to those of the engine starting system 1 according to the first embodiment except for the following points. So, like parts between the engine starting systems according to the first and third embodiments, to which like reference characters are assigned, are omitted or simplified in description.

The ECU 20 of the engine starting system according to the third embodiment is configured to execute an engine restart control subroutine illustrated in FIG. 9 described hereinafter, which is different from the engine restart control subroutine R2.

In the third embodiment, the ECU 20 is configured to select, in addition to the first to third restart control modes, a fourth restart control mode.

Figure 8:
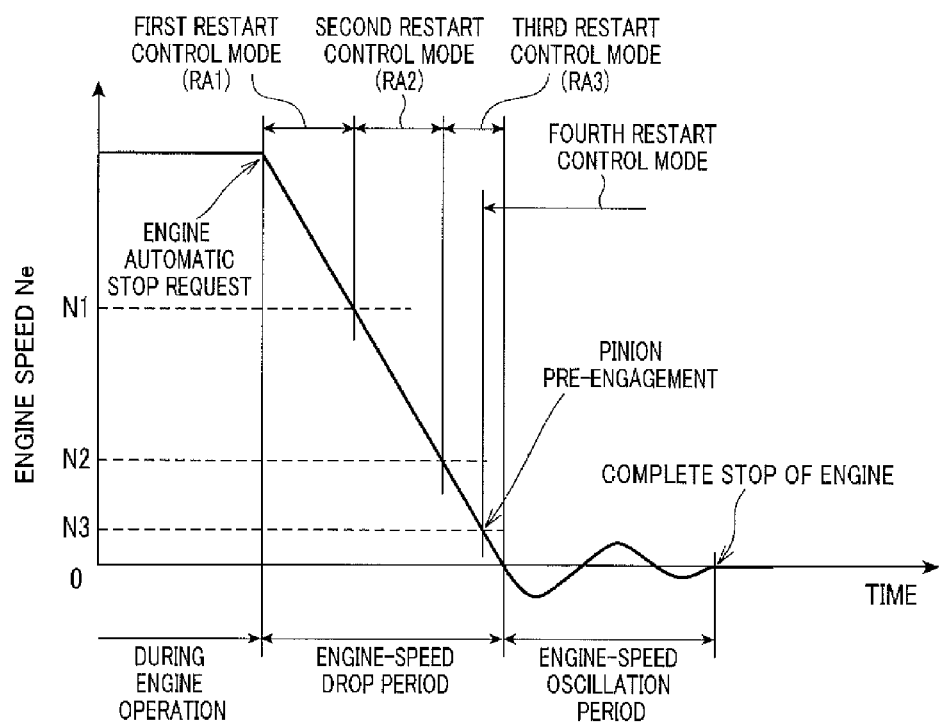
FIG. 8 is a timing chart schematically illustrating a relationship between the behavior of the engine speed and the first to fourth engine restart control modes according to a third embodiment of the present invention.
Figure 9:
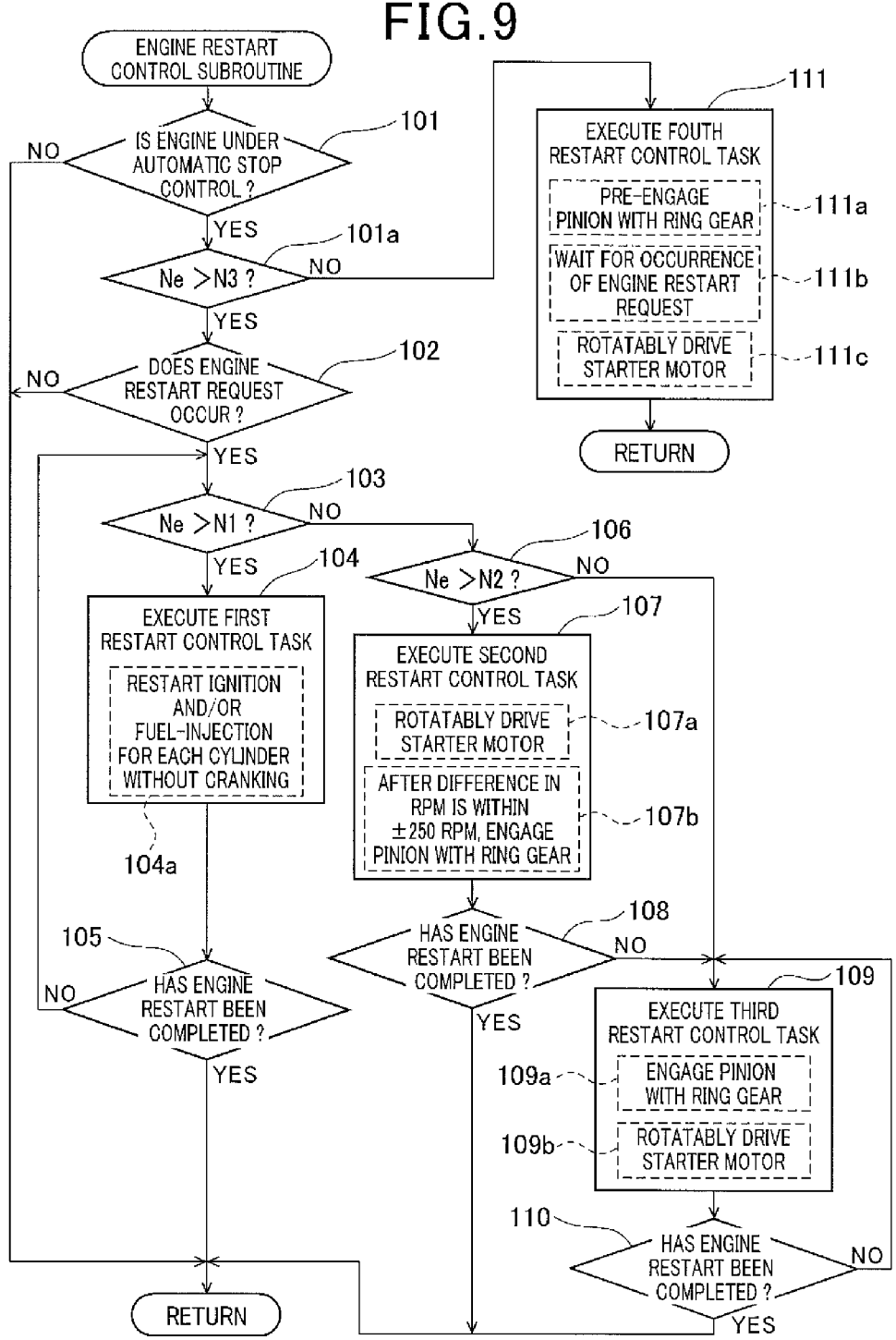
FIG. 9 is a flowchart schematically illustrating an engine restart control subroutine according to the third embodiment.

Specifically, referring to FIG. 8, during the engine-speed drop period by the automatic stop of the engine 21, when the engine speed Ne decreases to the third preset speed N3 without the engine restart request occurring, the ECU 20 shifts its operation mode to the fourth restart control mode, and carries out a fourth restart control task in the fourth restart control mode.

Specifically, in the fourth restart control mode, the ECU 20 drives the electromagnetic actuator 14 to shift the rotating pinion 13 toward the ring gear 23 so that the rotating pinion 13 is pre-engaged with the ring gear 23 prior to the occurrence of the engine restart request.

After the pre-engagement of the pinion 13 with the ring gear 23, the ECU 20 waits for the occurrence of the engine restart request.

When the engine restart request occurs, the ECU 20 drives the switching element 24 to turn it on, thus energizing the solenoid 25a. This rotatably drives the starter motor 12 to rotate the pinion 13 pre-engaged with the ring gear 23. This cranks the crankshaft 22 of the engine 21 to thereby restart the engine 21.

Next, an engine restart control task to be executed by the ECU 20 in accordance with the engine restart control subroutine according to the third embodiment illustrated in FIG. 9 will be described hereinafter. The engine restart control subroutine according to the third embodiment is repeatedly called in a given cycle during execution of the engine automatic stop-and-start control routine R1.

When the engine restart control subroutine is called, the ECU 20 determines the engine 21 is under the automatic stop control after the stop of burning of the air-fuel mixture in each cylinder in step 101.

Upon determining that the engine 21 is not under the automatic stop control (NO in step 101), the ECU 20 exits the engine restart control subroutine R2 without executing the following steps 102 to 110, and returns to the main routine R1.

Otherwise, upon determining that the engine 21 is under the automatic stop control (YES in step 101), the ECU 20 determines whether the engine speed Ne is higher than the third preset speed N3, such as 100 rpm in the third embodiment, in step 101a.

Upon determining that the engine speed Ne is higher than the third preset speed N3 (YES in step 101a), the ECU 20 determines whether the engine restart request occurs in step 102, and upon determining that the engine restart request occurs (YES in step 102), the ECU 20 proceeds to step 103. In step 103, the ECU 20 determines whether the engine speed Ne is higher than the first preset speed N1 to thereby determine whether the engine speed Ne is within the first speed range RA1.

When it is determined that the engine speed Ne is higher than the first preset speed N1 so that the engine restart request occurs with the engine speed Ne being within the first speed range RA1 (YES in step 103), the ECU 20 controls the ignition system 53 and/or the fuel injection system 55 to restart the ignition and/or the fuel-injection for each cylinder without cranking the crankshaft 22 by the starter 11, thus automatically restarting the engine 21 in steps 104 and 105.

Otherwise, when it is determined that the engine speed Ne is equal to or lower than the first preset speed N1 (NO in step 103), the ECU 20 proceeds to step 106. In step 106, the ECU 20 determines whether the engine speed Ne is higher than the second preset speed N2 to thereby determine whether the engine speed Ne is within the second speed range RA2 or the third speed range RA3.

Upon determining that the engine speed Ne is higher than the second preset speed N2 so that the engine restart request occurs with the engine speed Ne being within the second speed range RA2 (YES in step 106), the ECU 20 carries out the second restart control task in the second restart control mode.

Specifically, in the second restart control mode, the ECU 20 rotatably drives the starter motor 12 to thereby rotate the pinion 13, and, after the monitored rotational speed of the pinion 13 becomes close to that of the ring gear 23, drives the electromagnetic actuator 14 to shift the rotating pinion 13 toward the ring gear 23 so that the rotating pinion 13 is meshed with the ring gear 23 (in steps 107 and 108). The engagement of the rotating pinion 13 with the ring gear 23 cranks the crankshaft 22 of the engine 21 to thereby restart the engine 21.

Otherwise, upon determining that the engine speed Ne is equal to or lower than the second preset speed N2 so that the engine restart request occurs with the engine speed Ne being within the third speed range RA3 (NO in step 106), the ECU 20 carries out the third restart control task in the third restart control mode.

Specifically, in the third restart control mode, the ECU 20 drives the electromagnetic actuator 14 to shift the pinion 13 toward the ring gear 23 so that the pinion 13 is meshed with the ring gear 23, and after or during the engagement of the pinion 13 with the ring gear 23, rotatably drives the starter motor 12 to rotate the pinion 13 in steps 109 and 110. This cranks the crankshaft 22 of the engine 21 to thereby restart the engine 21.

On the other hand, when it is determined that the engine speed Ne is equal to or lower than the third preset speed N3 (NO in step 101a), the ECU 20 determines that the engine speed Ne decreases to the third preset speed N3 or below it without the engine restart request occurring. Then, the ECU 20 proceeds to step 111. In step 111, the ECU 20 shifts its operation mode to the fourth restart control mode, and carries out the fourth restart control task.

Specifically, in step 111a, the ECU 20 drives the electromagnetic actuator 14 to shift the rotating pinion 13 toward the ring gear 23 so that the rotating pinion 13 is pre-engaged with the ring gear 23 prior to the occurrence of the engine restart request.

After the pre-engagement of the pinion 13 with the ring gear 23, the ECU 20 waits for the occurrence of the engine restart request in step 111b.

When the engine restart request occurs, the ECU 20 drives the switching element 24 to turn it on, thus energizing the solenoid 25a in step 111c. This rotatably drives the starter motor 12 to rotate the pinion 13 in step 111c. This cranks the crankshaft 22 of the engine 21 to thereby restart the engine 21.

As described above, the engine starting system according to the third embodiment is designed to, during the engine-speed drop period by the automatic stop of the engine 21, carry out the fourth restart control task in the fourth restart control mode when the engine speed Ne decreases to the third preset speed N3 without the engine restart request occurring.

Specifically, the engine starting system according to the third embodiment is designed to shift the rotating pinion 13 toward the ring gear 23 so that the rotating pinion 13 is pre-engaged with the ring gear 23 prior to the occurrence of the engine restart request.

The configuration allows the pinion 13 to be pre-engaged with the ring gear 23 before the engine-speed oscillation period, thus preventing the pinion 13 from being meshed within the engine-speed oscillation period. This makes it possible to prevent breakage of the starter 11 due to the engagement of the pinion 13 with the ring gear 23 within the engine-speed oscillation period. In addition, this makes it possible to prevent noises and impacts from occurring due to the engagement of the pinion 13 with the ring gear 23 within the engine-speed oscillation period.

After the pre-engagement of the pinion 13 to the ring gear 23 prior to the occurrence of the engine restart request, when the engine restart request occurs, the ECU 20 works to rotatably drive the starter motor 12 with the pinion 13 to crank the crankshaft 22, thus restarting the engine 21, making it possible to immediately restart the engine 21 in response to the occurrence of the engine restart request.

Note that the engine restart control subroutine according to the third embodiment is designed to cause the ECU 20 to execute the combination of the first to third restart control tasks according to the first embodiment and the forth restart control task. The engine restart control subroutine according to the third embodiment can be designed to cause the ECU 20 to execute the combination of the first to third restart control tasks according to the second embodiment and the forth restart control task.

Fourth Embodiment

A starting system for an internal combustion engine installed in a vehicle according to the fourth embodiment of the present invention will be described hereinafter with reference to FIGS. 10 and 11.

The hardware and software structures of the engine starting system according to the fourth embodiment are substantially identical to those of the engine starting system 1 according to the first embodiment except for the following points. So, like parts between the engine starting systems according to the first and fourth embodiments, to which like reference characters are assigned, are omitted or simplified in description.

The ECU 20 of the engine starting system according to the fourth embodiment is configured to execute an engine restart control subroutine illustrated in FIG. 11 described hereinafter, which is different from the engine restart control subroutine R2.

Figure 10:
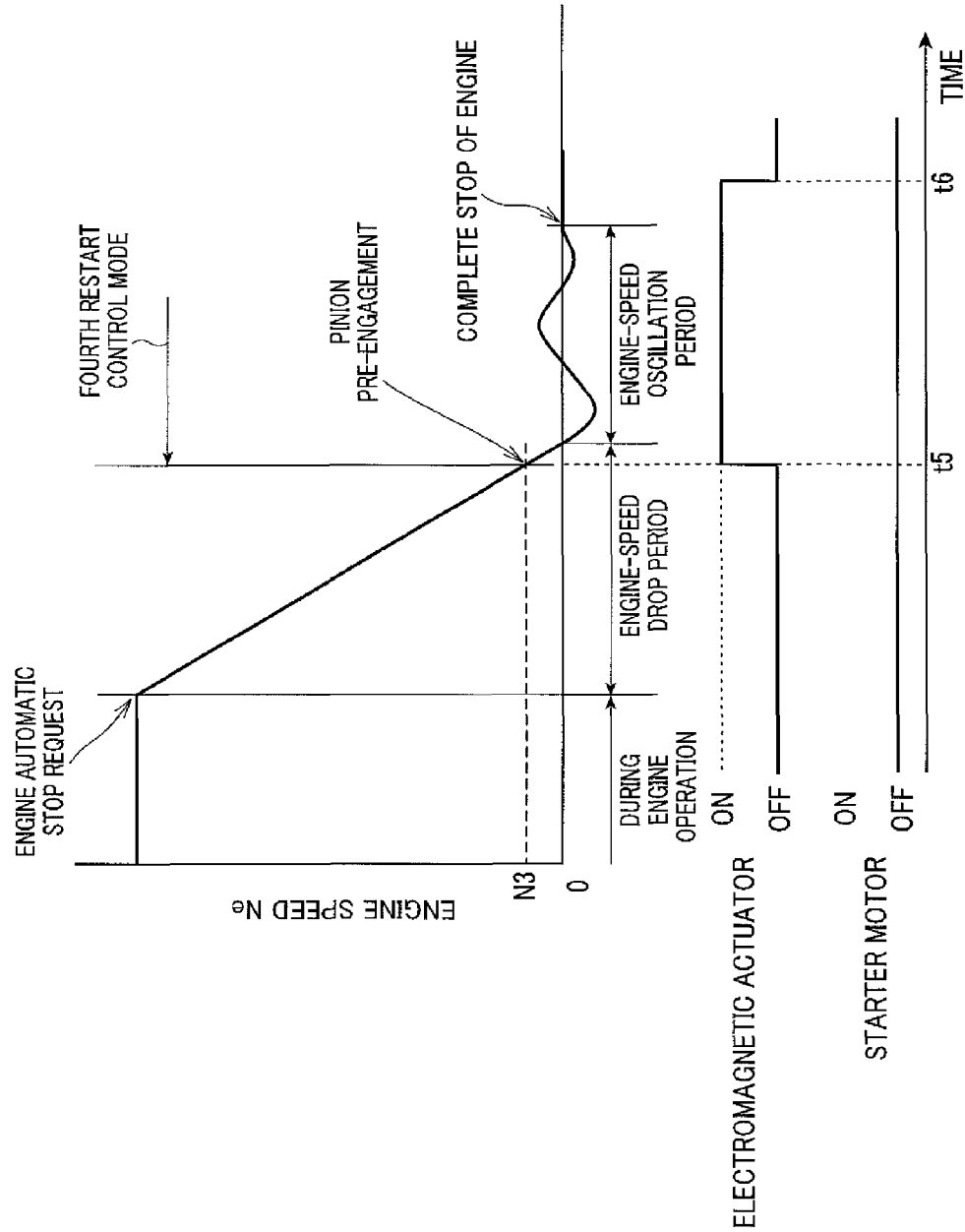
FIG. 10 is a timing chart schematically illustrating driving timings of the electromagnetic actuator and the starter motor when the ECU operates in the fourth engine restart control mode according to a fourth embodiment of the present invention.
Figure 11:
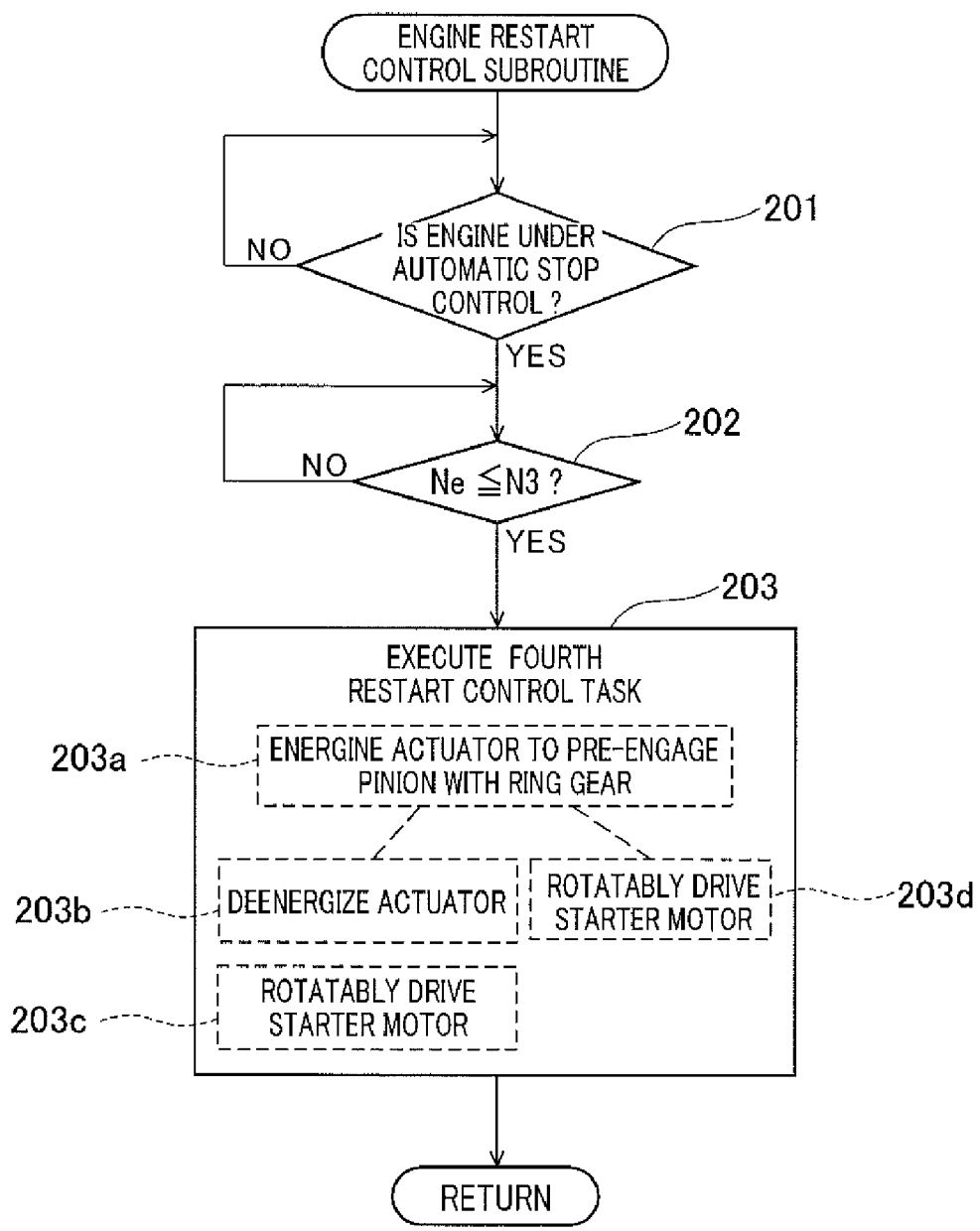
FIG. 11 is a flowchart schematically illustrating an engine restart control subroutine according to the fourth embodiment.

Specifically, referring to FIG. 10, during the engine-speed drop period by the automatic stop of the engine 21, even if the engine restart request occurs with the engine speed Ne being greater than the third preset speed N3, the ECU 20 waits for the execution of the engine restart control subroutine.

In addition, during the engine-speed drop period by the automatic stop of the engine 21, when the engine speed Ne decreases to the third preset speed N3, the ECU 20 shifts its operation mode to the fourth restart control mode, and carries out a fourth restart control task in the fourth restart control mode.

Specifically, in the fourth restart control mode, during the engine-speed drop period by the automatic stop of the engine 21, when the engine speed Ne decreases to the third preset speed N3 at time t5, the ECU 20 energizes the electromagnetic actuator 14 to shift the rotating pinion 13 toward the ring gear 23 so that the rotating pinion 13 is preset to be meshed with the ring gear 23.

When the engine restart request has not occurred yet before the pinion preset and a predetermined time required to complete the full engagement of the pinion 13 with the ring gear 23 has elapsed at time t6 since the energization of the electromagnetic actuator 14, the ECU 20 determines that the engagement of the pinion 13 with the ring gear 23 is maintained even if the electromagnetic actuator 14 is deenergized, thus deenergizing the electromagnetic actuator 14. Thereafter, when the engine restart request occurs, the ECU 20 drives the switching element 24 to turn it on, thus energizing the solenoid 25a. This rotatably drives the starter motor 12 to rotate the pinion 13. This cranks the crankshaft 22 of the engine 21 to thereby restart the engine 21.

Otherwise, when the engine restart request has occurred before the pinion preset, the ECU 20 immediately drives the switching element 24 to turn it on, thus energizing the solenoid 25a. This rotatably drives the starter motor 12 to rotate the pinion 13. This cranks the crankshaft 22 of the engine 21 to thereby restart the engine 21.

Next, an engine restart control task to be executed by the ECU 20 in accordance with the engine restart control subroutine according to the fourth embodiment illustrated in FIG. 11 will be described hereinafter. The engine restart control subroutine according to the fourth embodiment is repeatedly called in a given cycle during execution of the engine automatic stop-and-start control routine R1.

When the engine restart control subroutine is called, the ECU 20 determines whether the engine 21 is under the automatic stop control after the stop of burning of the air-fuel mixture in each cylinder in step 201.

Upon determining that the engine 21 is not under the automatic stop control (NO in step 201), the ECU 20 repeatedly carries out the determination in step 201.

Thereafter, upon determining that the engine 21 is under the automatic stop control (YES in step 201), the ECU 20 determines whether the engine speed Ne is equal to or lower than the third preset speed N3, such as 100 rpm in the fourth embodiment, in step 202.

Upon determining that the engine speed Ne is higher than the third preset speed N3 (NO in step 202), the ECU 20 repeatedly carries out the determination in step 202.

Thereafter, upon determining that the engine speed Ne is equal to lower than the third preset speed N3 (YES in step 202), the ECU 20 determines that the engine speed Ne decreases to the third preset speed N3 or below it. Then, the ECU 20 proceeds to step 203. In step 203, the ECU 20 shifts its operation mode to the fourth restart control mode, and carries out the fourth restart control task.

Specifically, in step 203a, the ECU 20 energizes the electromagnetic actuator 14 to shift the rotating pinion 13 toward the ring gear 23 so that the rotating pinion 13 is pre-engaged with the ring gear 23.

When the engine restart request has not occurred yet before the pinion preset and the predetermined time required to complete the full engagement of the pinion 13 with the ring gear 23 has elapsed since the energization of the electromagnetic actuator 14, the ECU 20 determines that the engagement of the pinion 13 with the ring gear 23 is maintained even if the electromagnetic actuator 14 is deenergized, thus deenergizing the electromagnetic actuator 14 in step 203b. Thereafter, when the engine restart request occurs, the ECU 20 drives the switching element 24 to turn it on, thus energizing the solenoid 25a in step 203c. This rotatably drives the starter motor 12 to rotate the pinion 13 in 203c. This cranks the crankshaft 22 of the engine 21 to thereby restart the engine 21.

Otherwise, when the engine restart request has occurred before the pinion preset, the ECU 20 immediately drives the switching element 24 to turn it on, thus energizing the solenoid 25a in step 203d. This rotatably drives the starter motor 12 to rotate the pinion 13 in 203d. This cranks the crankshaft 22 of the engine 21 to thereby restart the engine 21.

As described above, the engine starting system according to the fourth embodiment is designed to, when the engine speed Ne decreases to the third preset speed N3, energize the electromagnetic actuator 14 to shift the rotating pinion 13 toward the ring gear 23 so that the rotating pinion 13 is pre-energized with the ring gear 23.

When the engine restart request has not occurred yet before the pinion preset and the predetermined time has elapsed since the energization of the electromagnetic actuator 14, the ECU 20 deenergizes the electromagnetic actuator 14. Thus, the ECU 20 maintains the deenergized state of the electromagnetic actuator 14 before the occurrence of the engine restart request, making it possible to reduce the power consumption of the starter 11.

Note that, in the third embodiment, the engine starting system can be programmed to:

energize the electromagnetic actuator 14 to shift the rotating pinion 13 toward the ring gear 23 so that the rotating pinion 13 is pre-energized with the ring gear 23; and when the engine restart request has not occurred yet before the pinion preset and the predetermined time has elapsed since the energization of the electromagnetic actuator 14, deenergize the electromagnetic actuator 14.

The engine starting system according to the third or fourth embodiment can be equipped with a sensor 71 illustrated by phantom lines in FIG. 1; this sensor 71 is electrically connected to the ECU 20 and arranged to check whether the pinion 13 is fully engaged with the ring gear 23. That is, the ECU 20 according to the third or fourth embodiment can be programmed to deenergize the electromagnetic actuator 14 when data indicative of the full engagement of the pinion 13 and the ring gear 23 is sent from the sensor 71 without measuring the predetermined time.

Fifth Embodiment

A starting system for an internal combustion engine installed in a vehicle according to the fifth embodiment of the present invention will be described hereinafter with reference to FIGS. 12 and 13.

The hardware and software structures of the engine starting system according to the fifth embodiment are substantially identical to those of the engine starting system 1 according to the first embodiment except for the following points. So, like parts between the engine starting systems according to the first and fifth embodiments, to which like reference characters are assigned, are omitted or simplified in description.

The ECU 20 of the engine starting system according to the fifth embodiment is configured to execute an engine restart control subroutine illustrated in FIG. 13 described hereinafter, which is different from the engine restart control subroutine R2.

Figure 12:
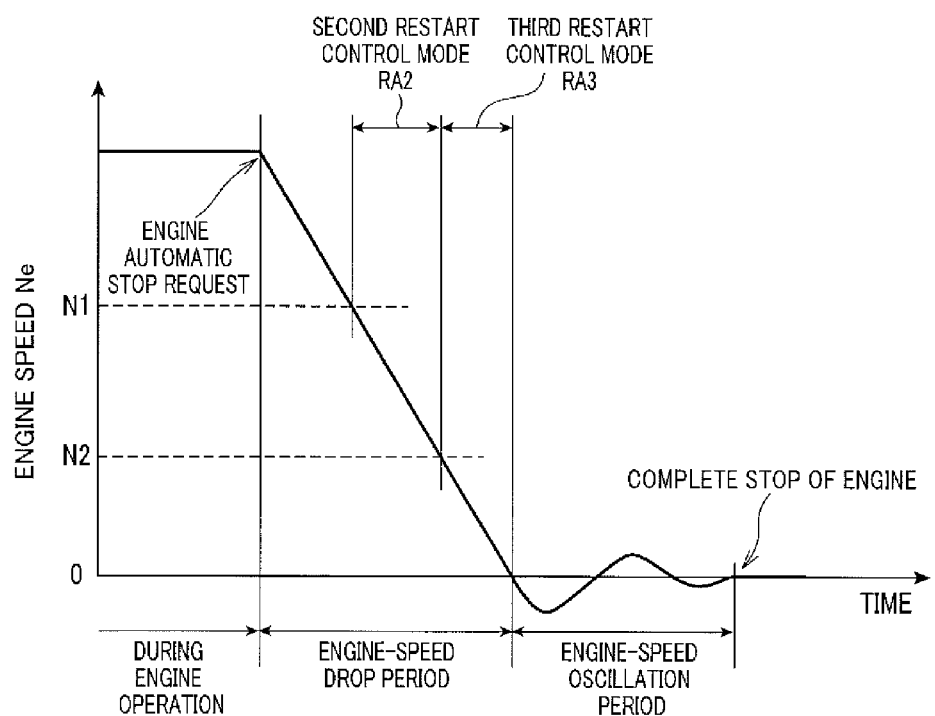
FIG. 12 is a timing chart schematically illustrating a relationship between the behavior of the engine speed and the second and third engine restart control modes according to a fifth embodiment of the present invention.
Figure 13:
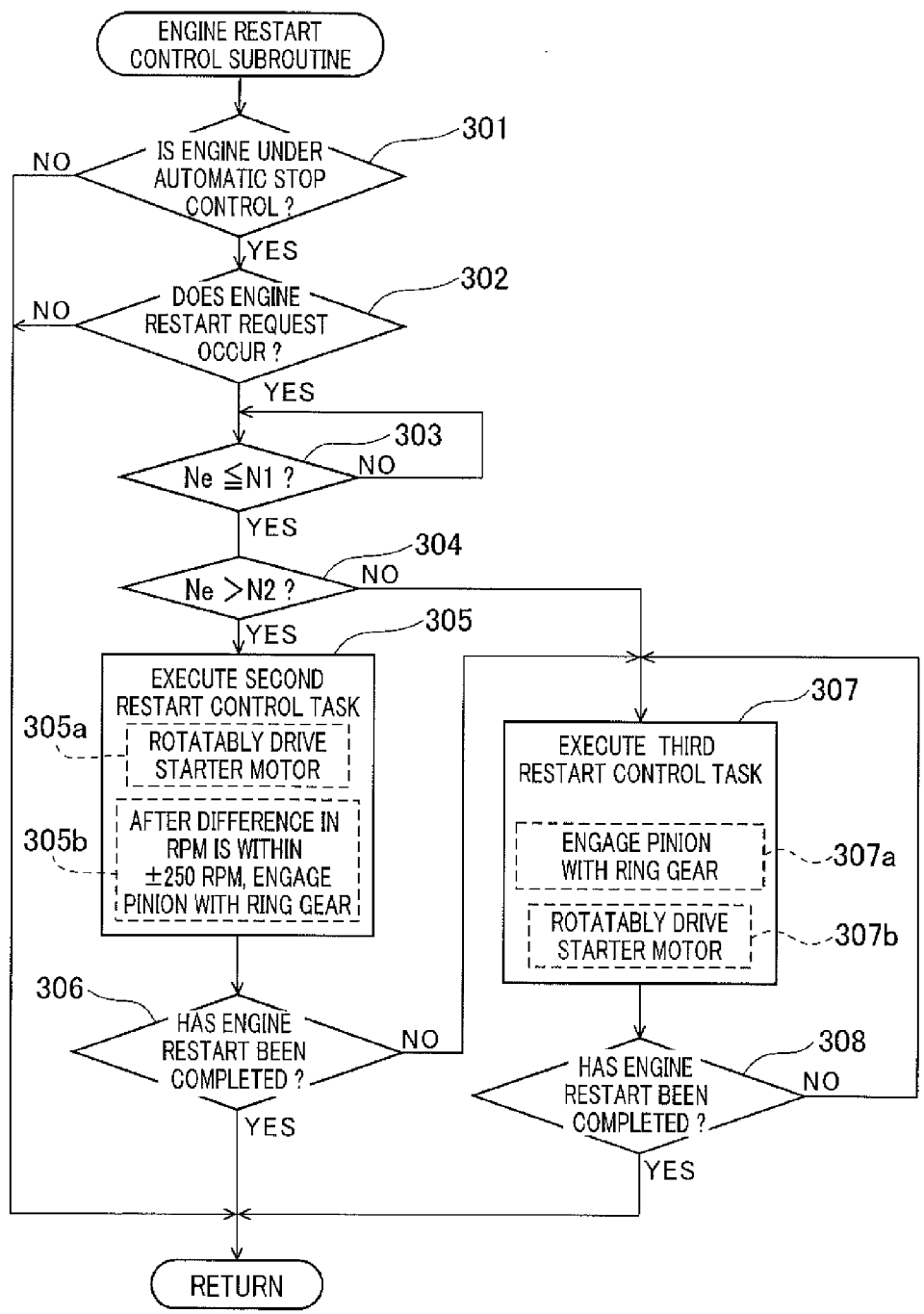
FIG. 13 is a flowchart schematically illustrating an engine restart control subroutine according to the fifth embodiment.

Specifically, referring to FIG. 12, during the engine-speed drop period by the automatic stop of the engine 21, the ECU 20 is programmed to select one of predetermined second and third restart control modes based on the engine speed after the automatic stop of the engine 21 without selecting the first restart control mode.

Next, an engine restart control task to be executed by the ECU 20 in accordance with the engine restart control subroutine according to the fifth embodiment illustrated in FIG. 13 will be described hereinafter. The engine restart control subroutine according to the fifth embodiment is repeatedly called in a given cycle during execution of the engine automatic stop-and-start control routine R1.

When the engine restart control subroutine is called, the ECU 20 determines whether the engine restart request occurs during the engine 21 being under automatic stop control in steps 301 and 302 equivalent to steps 101 and 102.

Upon determining that the engine restart request occurs (YES in step 302), the ECU 20 proceeds to step 303 and determines whether the engine speed Ne is equal to or lower than the first preset speed N1 to thereby determine whether the engine speed Ne is within the first speed range RA1 in step 303.

When it is determined that the engine speed Ne is higher than the first preset speed N1 so that the engine restart request occurs with the engine speed Ne being within the first speed range RA1 (NO in step 303), the ECU 20 repeatedly carries out the determination without carrying out the first restart control task in step 303.

Thereafter, when it is determined that the engine speed Ne is equal to or lower than the first preset speed N1 (YES in step 303), the ECU 20 proceeds to step 304. In step 304, the ECU 20 determines whether the engine speed Ne is higher than the second preset speed N2.

Upon determining that the engine speed Ne is higher than the second preset speed N2 (YES in step 304), the ECU 20 proceeds to step 305.

In steps 305 and 306 equivalent to steps 107 and 108, the ECU 20 shifts its operation mode to the second restart control mode, and carries out the second restart control task.

Specifically, the ECU 20 drives the electromagnetic actuator 14 to shift the pinion 13 toward the ring gear 23 so that the pinion 13 is meshed with the ring gear 23 in step 305a. After or during the engagement of the pinion 13 with the ring gear 23, the ECU 20 rotatably drives the starter motor 12 to rotate the pinion 13 in step 305b. This cranks the crankshaft 22 of the engine 21 to thereby restart the engine 21.

Otherwise, upon determining that the engine speed Ne is equal to or lower than the second preset speed N2 so that the engine restart request occurs with the engine speed Ne being within the third speed range RA3 (NO in step 304), the ECU 20 proceeds to step 307. In steps 307 and 308 equivalent to steps 109 and 110, the ECU 20 shifts its operation mode to the third restart control mode, and carries out the third restart control task in the third restart control mode.

Specifically, the ECU 20 drives the electromagnetic actuator 14 to shift the pinion 13 toward the ring gear 23 so that the pinion 13 is meshed with the ring gear 23 in step 307a, and after or during the engagement of the pinion 13 with the ring gear 23, rotatably drives the starter motor 12 to rotate the pinion 13 in step 307b. This cranks the crankshaft 22 of the engine 21 to thereby restart the engine 21.

As described above, the engine starting system according to the fifth embodiment makes it possible to carry out any one of the second and third engine restart tasks that is most suitable for the engine speed Ne at the moment when the engine restart request occurs during the engine-speed drop period. This achieves an advantage of preventing or reducing noises and impacts from occurring due to the engagement of the pinion 13 with the ring gear 23 and an advantage of reducing the power consumption of the starter 11.

Note that the engine restart control subroutine according to the fifth embodiment can be designed to cause the ECU 20 to execute the combination of the second and third restart control tasks according to the second embodiment.

When the engine restart request occurs with the monitored engine speed Ne being within the engine-speed drop period or the engine-speed oscillation period, after the monitored difference in rotational speed between the ring gear 23 and the pinion 13 naturally falls within a range of ±250 rpm, the ECU 20 can carry out the operation in steps 109a and 109b as a first modification of each of the first to fifth embodiments.

Specifically, the ECU 20 according to the first modification drives the electromagnetic actuator 14 to shift the pinion 13 toward the ring gear 23 so that the pinion 13 is meshed with the ring gear 23 (see step 109a). After or during the engagement of the pinion 13 with the ring gear 23, the ECU 20 according to the first modification rotatably drives the starter motor 12 to rotate the pinion 13. This cranks the crankshaft 22 of the engine 21 to thereby restart the engine 21 (see step 109b).

When the engine restart request occurs with the monitored engine speed Ne being within the engine-speed drop period or the engine-speed oscillation period, after the monitored difference in rotational speed between the ring gear 23 and the pinion 13 falls within a range of ±250 rpm by rotatable drive of the pinion 13, the ECU 20 can be programmed to carry out the operation in step 107b as a second modification of each of the first to fifth embodiments.

Specifically, the ECU 20 according to the second modification drives the electromagnetic actuator 14 to shift the rotating pinion 13 toward the ring gear 23 so that the rotating pinion 13 is meshed with the ring gear 23, thus restarting the engine 21 (see step 107b).

Both the first and second modifications can prevent or reduce noises and impacts due to the engagement. In addition, the measurement accuracy of the rotational speeds of the pinion 13 and the ring gear 23 need not be high. This eliminates the need to provide a rotational speed sensor with a high cost for measuring the rotational speed of the pinion 13.

Thus, the engine starting system according to each of the first and second modifications meets the low-cost requirements for vehicles as recent important technical requirements.

The engine starting system with the one-way clutch 51 according to each of the first to fifth embodiments can carry out the restart of the engine 21 when the engine restart request occurs with the monitored engine speed Ne being within the engine-speed drop period or the engine-speed oscillation period.

Figure 14:
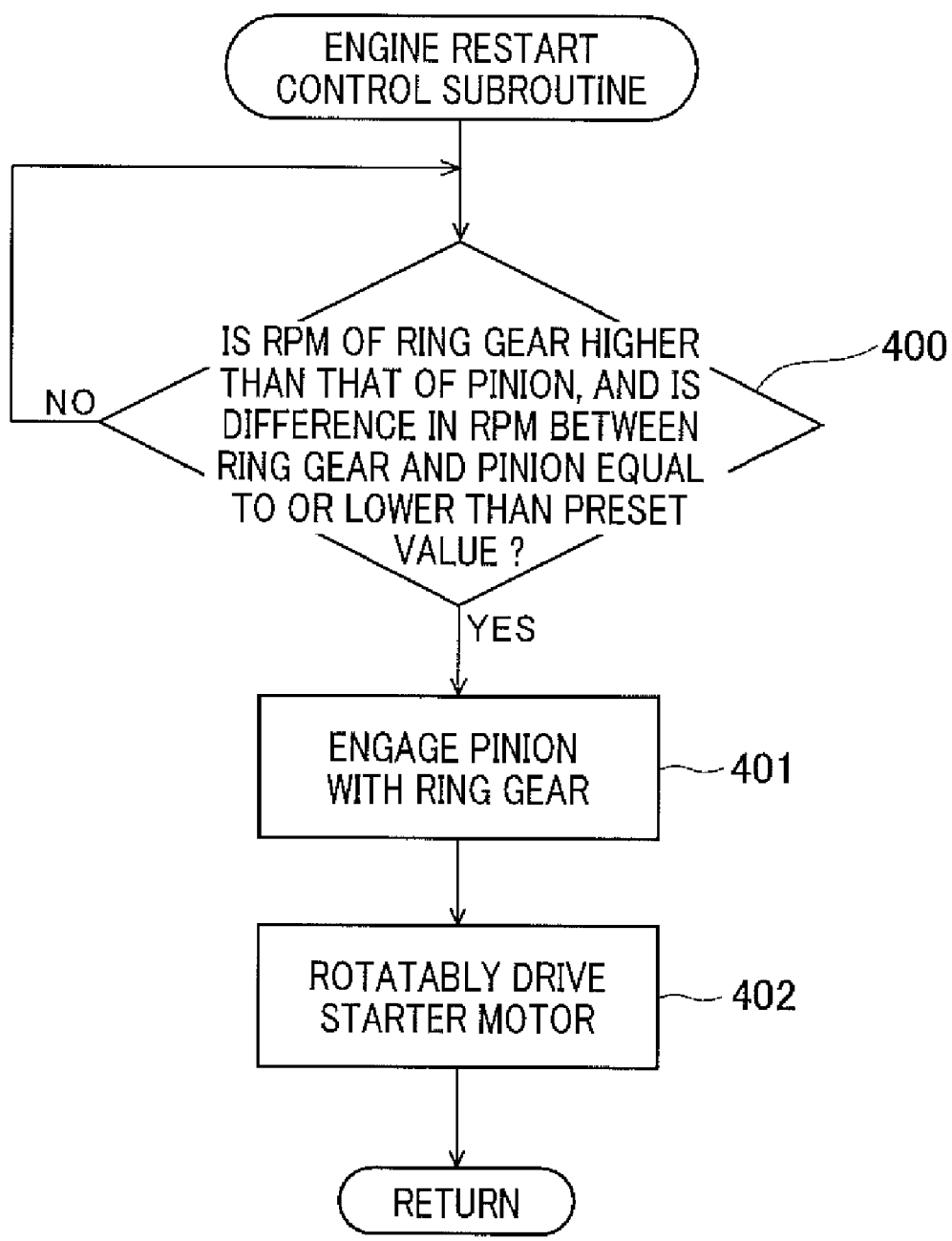
FIG. 14 is a flowchart schematically illustrating a part of an engine restart control subroutine according to a modification of each of the first to fifth embodiments.

Specifically, when the rotational speed of the ring gear 23 is higher than that of the pinion 13, and the difference in rotational speed between the ring gear 23 and the pinion 13 is equal to or lower than a preset value of, for example, 200 rpm (see step 400 in FIG. 14), the engine starting system can drive the electromagnetic actuator 14 to shift the pinion 13 toward the ring gear 23 so that the pinion 13 is meshed with the ring gear 23 (see step 401). After or during the engagement of the pinion 13 with the ring gear 23, the engine starting system can rotatably drive the starter motor 12 to rotate the pinion 13. This cranks the crankshaft 22 of the engine 21 to thereby restart the engine 21 (see step 402).

The engine starting system according to each of the aforementioned embodiments and their modifications can be provided with a crank angle sensor included in the sensors 59. The crank angle sensor is operative to measure a rotational angular position of the crankshaft 22 relative to a reference position every time the crankshaft 22 is rotated by a preset angle. The crank angle sensor is operative to output, to the ECU 20, the measured data (measured rotational angular position). Based on the measured data sent from the crank angle sensor, the ECU 20 can obtain the engine speed Ne.

The engine starting system according to each of the aforementioned embodiments and their modifications can be provided with a rotational speed sensor included in the sensors 59 and operative to measure the rotational angle of the pinion 13. The rotational angle sensor is operative to output, to the ECU 20, the measured rotational angle. Based on the measured data sent from the crank angle sensor, the ECU 20 can obtain the rotational angle of the pinion 13.

While there has been described what is at present considered to be the embodiments and their modifications of the present invention, it will be understood that various modifications which are not described yet may be made therein, and it is intended to cover in the appended claims all such modifications as fall within the scope of the invention.

What is claimed is:

1. A system for restarting, according to an occurrence of an engine restart request, an internal combustion engine that has been automatically controlled for stopping in response to an engine automatic stop request, the internal combustion engine normally working to burn fuel therein to rotate a crankshaft with a ring gear attached thereto, the system comprising:
   a starter provided with a motor for rotatably driving an output shaft with a pinion and an actuator working to shift the pinion toward the ring gear to be engaged with the ring gear;
   a monitor unit working to monitor a rotational speed of the internal combustion engine, the rotational speed of the internal combustion engine dropping by the automatic control for stopping the internal combustion engine; and
   when the engine restart request occurs with the rotational speed being within a preset range during the rotational speed of the internal combustion engine dropping by the automatic control for stopping the internal combustion engine, a drive unit working to:
   drive the actuator to shift the pinion toward the ring gear to be engaged with the ring gear while the pinion is kept non-rotated so that there is a difference in rotational-speed between the pinion and the ring gear; and
   rotatably drive the motor with the pinion being at least partly engaged with the ring gear to thereby crank the crankshaft of the internal combustion engine.

2. A system for restarting, according to an occurrence of an engine restart request, an internal combustion engine that has been automatically controlled for stopping in response to an engine automatic stop request, the internal combustion engine normally working to burn fuel therein to rotate a crankshaft with a ring gear attached thereto, the system comprising:
   a starter provided with a motor for rotatably driving an output shaft with a pinion and an actuator working to shift the pinion toward the ring gear to be engaged with the ring gear;
   a monitor unit working to monitor a rotational speed of the internal combustion engine, the rotational speed of the internal combustion engine dropping by the automatic control for stopping the internal combustion engine; and
   when the engine restart request occurs with the rotational speed being within a preset range during the rotational speed of the internal combustion engine dropping by the automatic control for stopping the internal combustion engine, a drive unit working to:
   activate the actuator to shift the pinion toward the ring gear to be engaged with the ring gear while the motor is kept off so that there is a difference in rotational-speed between the pinion and the ring gear; and
   rotatably drive the motor with the pinion being at least partly engaged with the ring gear to thereby crank the crankshaft of the internal combustion engine.

* * * * *